(12) United States Patent
Hashimoto

(10) Patent No.: US 10,635,846 B2
(45) Date of Patent: Apr. 28, 2020

(54) TIMING ERROR ANALYSIS METHOD AND INFORMATION PROCESSING APPARATUS

(71) Applicant: FUJITSU LIMITED, Kawasaki-shi, Kanagawa (JP)

(72) Inventor: Michitaka Hashimoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/053,856

(22) Filed: Aug. 3, 2018

(65) Prior Publication Data

US 2019/0057174 A1    Feb. 21, 2019

(30) Foreign Application Priority Data

Aug. 18, 2017    (JP) .................. 2017-157943

(51) Int. Cl.

| | | |
|---|---|---|
| *G01F 23/296* | (2006.01) | |
| *G06F 30/3312* | (2020.01) | |
| *G06N 20/00* | (2019.01) | |
| *G06F 30/34* | (2020.01) | |
| *G06F 119/06* | (2020.01) | |
| *G06F 119/12* | (2020.01) | |

(52) U.S. Cl.
CPC .......... *G06F 30/3312* (2020.01); *G06F 30/34* (2020.01); *G06N 20/00* (2019.01); *G06F 2119/06* (2020.01); *G06F 2119/12* (2020.01)

(58) Field of Classification Search
CPC ............. G06F 17/5031; G06F 17/5054; G06F 2217/78; G06F 2217/84; G06N 20/00; G01F 23/2962; G01F 23/0069; G01S 7/521; G01S 15/88; A47G 19/00
See application file for complete search history.

(56) References Cited

U.S. PATENT DOCUMENTS

| | | | |
|---|---|---|---|
| 5,889,677 A | 3/1999 | Yasuda et al. | |
| 6,240,541 B1 | 5/2001 | Yasuda et al. | |
| 6,553,548 B1* | 4/2003 | Hekmatpour | ....... G06F 17/5022 716/106 |
| 6,857,112 B1* | 2/2005 | Teig | ....... G06F 17/5036 716/115 |

(Continued)

FOREIGN PATENT DOCUMENTS

| | | |
|---|---|---|
| JP | 8-278998 | 10/1996 |
| JP | 2003-30264 | 1/2003 |

*Primary Examiner* — Nha T Nguyen
(74) *Attorney, Agent, or Firm* — Fujitsu Patent Center

(57) ABSTRACT

A timing error analysis method includes, extracting, from error information, a design value related to a delay amount of a signal path and a feature that is an input when a machine learning model learns with the design value as an output, estimating a correct answer value of the design value from the feature and the machine learning model learning a relationship between the design value and the feature, comparing the design value with the correct answer value and storing a comparison result, generating a comparison result list including countermeasures for eliminating the timing error according to the comparison result, aggregating signal paths included in the comparison result list for each design block to generate an error list including information indicating the signal paths aggregated for each of the design blocks and the countermeasures, and outputting the error list.

8 Claims, 20 Drawing Sheets

(56) References Cited

U.S. PATENT DOCUMENTS

| | | | | |
|---|---|---|---|---|
| 8,201,123 B1* | 6/2012 | Nethercot | ............ | G06F 17/5054 716/113 |
| 8,863,052 B1* | 10/2014 | Dhuria | ................ | G06F 17/5036 716/108 |
| 9,767,239 B1* | 9/2017 | Buck | ................... | G06F 17/5081 |
| 9,875,333 B1* | 1/2018 | Verma | ................ | G06F 17/5031 |
| 10,031,986 B1* | 7/2018 | Kumar | ................ | G06F 17/5031 |
| 2003/0014725 A1* | 1/2003 | Sato | .................... | G06F 17/5036 716/112 |
| 2003/0101399 A1* | 5/2003 | Yoshikawa | ........... | G06F 17/505 714/744 |
| 2003/0237067 A1* | 12/2003 | Mielke | ................ | G06F 17/5031 716/103 |
| 2006/0123281 A1* | 6/2006 | Lung Ko | ........... | G06F 17/5031 714/718 |
| 2006/0218515 A1* | 9/2006 | Byrn | .................. | G06F 17/5072 716/113 |
| 2007/0050745 A1* | 3/2007 | Dinter | ................ | G06F 17/5031 716/114 |
| 2007/0079266 A1* | 4/2007 | Devineni | ............ | G06F 17/5081 716/112 |
| 2008/0155483 A1* | 6/2008 | Chen | .................. | G06F 17/5009 716/102 |
| 2009/0259979 A1* | 10/2009 | Smith | ................ | G06F 17/5031 716/113 |
| 2009/0276744 A1* | 11/2009 | Akutsu | ............... | G06F 17/5031 716/113 |
| 2010/0077271 A1* | 3/2010 | Irie | ....................... | G06F 17/505 714/744 |
| 2011/0154139 A1* | 6/2011 | Ishida | .............. | G01R 31/31835 714/726 |
| 2012/0216163 A1* | 8/2012 | Ura | ..................... | G06F 17/5036 716/113 |
| 2012/0240087 A1* | 9/2012 | Chang | ................ | G06F 17/5031 716/102 |
| 2013/0239078 A1* | 9/2013 | Chu | ..................... | G06F 17/5031 716/113 |
| 2014/0068536 A1* | 3/2014 | Oda | .................... | G06F 17/5031 716/113 |
| 2015/0127131 A1* | 5/2015 | Herrman | ............ | G05B 19/4097 700/98 |
| 2015/0161312 A1* | 6/2015 | Drasny | .............. | G06F 17/5031 716/108 |
| 2017/0083658 A1* | 3/2017 | Haller | ................ | G06F 17/5081 |
| 2017/0277818 A1* | 9/2017 | Dai | ..................... | G06F 17/505 |
| 2017/0371998 A1* | 12/2017 | Krauch | ............. | G06F 17/5031 |
| 2018/0121584 A1* | 5/2018 | Hashimoto | ......... | G06F 17/5031 |
| 2018/0121594 A1* | 5/2018 | Studders | ............ | G06F 17/5081 |
| 2018/0203956 A1* | 7/2018 | Ng | ........................ | G06F 17/505 |
| 2018/0307790 A1* | 10/2018 | Chuang | ............. | G06F 17/5077 |
| 2018/0359852 A1* | 12/2018 | Geva | .................... | H05K 1/0292 |
| 2019/0080036 A1* | 3/2019 | Dai | ..................... | G06F 17/5068 |

* cited by examiner

FIG. 3

PATH 1

TRANSMITTING: AAA
RECEIVING: BBB
PERIOD: 8[ns]
VIOLATION AMOUNT: -1.2[ns]

| TOTAL DELAY | DELAY INCREASE AMOUNT | TYPE | COORDINATE | ELEMENT INFORMATION | |
|---|---|---|---|---|---|
| 7.151 | 0.132 | OMISSION CELL | X9_Y68 | AAA (TRANSMITTING) | X COORDINATE OF AAA (TRANSMITTING):9<br>X COORDINATE OF BBB (RECEIVING):17<br>X COORDINATE OF ELEMENT A (INTERMEDIATE CELL):100<br>SINCE X COORDINATE IS CHANGED TO 9→100→17, POSITION OF ELEMENT A (INTERMEDIATE CELL) IS FAR |
| 14.605 | 1.076 | OMISSION CELL | X100_Y66 | ELEMENT A (INTERMEDIATE CELL) | |
| 17.780 | 0.263 | OMISSION CELL | X17_Y66 | BBB (RECEIVING) | |

DELAY INCREASE AMOUNT IS LARGE

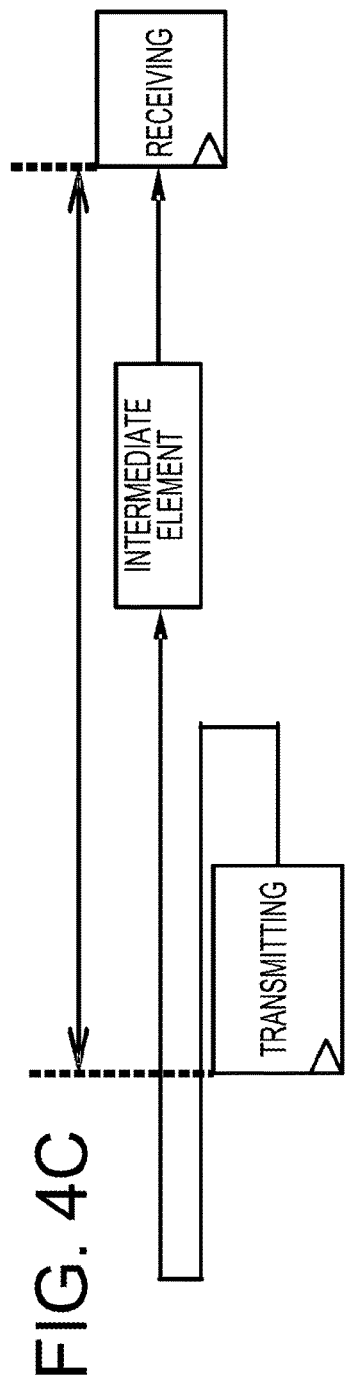
FIG. 4B
ELEMENT ARRANGEMENT POSITION FACTOR INCREASES WHEN ELEMENT ARRANGEMENT POSITION IS FAR
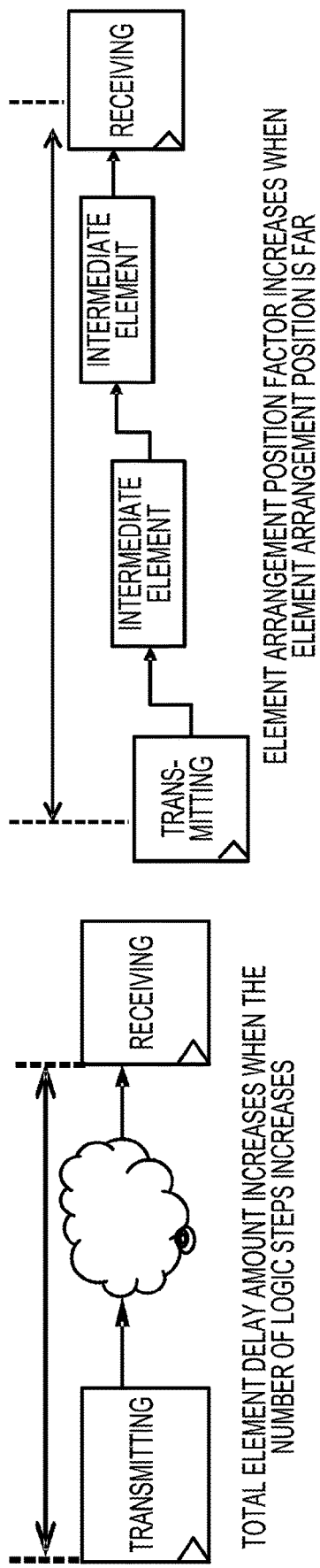
FIG. 4A
TOTAL ELEMENT DELAY AMOUNT INCREASES WHEN THE NUMBER OF LOGIC STEPS INCREASES
FIG. 4C
WIRING DETOURING FACTOR INCREASES WHEN WIRING IS LENGTHENED FIG. 8
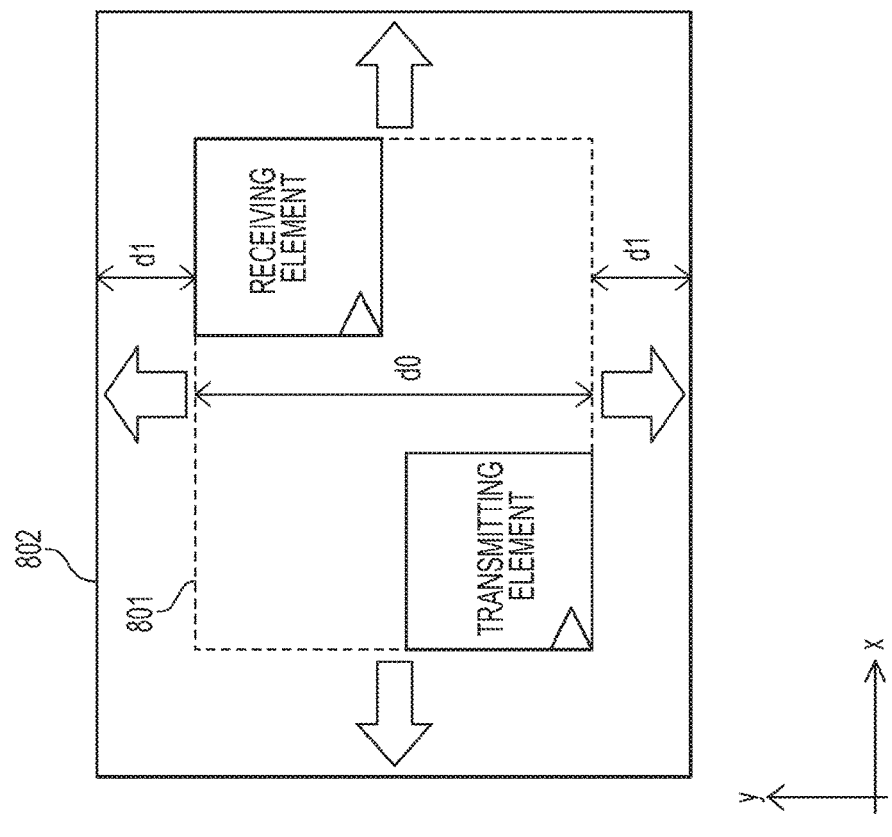
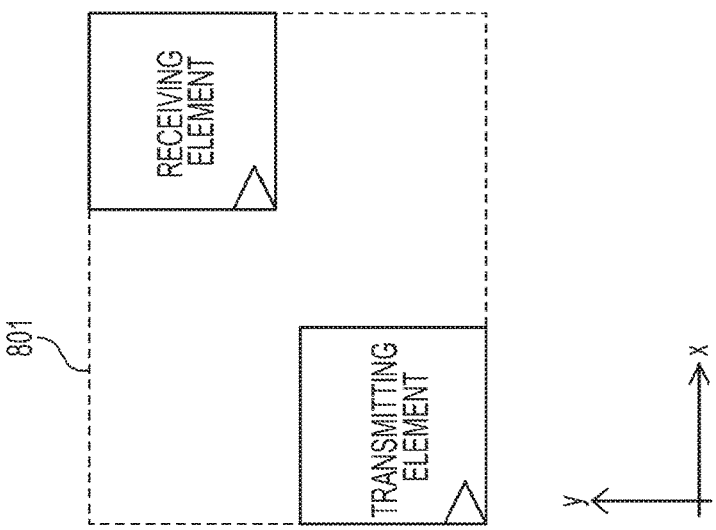

| PATH IDEN-TIFIER | TRANSMITTING ELEMENT IDENTIFIER | RECEIVING ELEMENT IDENTIFIER | COMPARISON RESULT | | | | COUNTERMEASURES |
|---|---|---|---|---|---|---|---|
| | | | TOTAL ELEMENT DELAY AMOUNT | TOTAL WIRING DELAY AMOUNT | ARRANGEMENT POSITION | DETOURING WIRING | |
| 1 | A/FF0[31] | A/FF1[0] | NG | OK | OK | OK | REDUCTION OF THE NUMBER OF LOGIC STEPS |
| 2 | A/FF1 | B/FF0 | OK | NG | NG | OK | REDUCTION OF ARRANGEMENT AREA |
| 3 | A/FF0[29] | A/FF1[3] | NG | OK | OK | OK | REDUCTION OF THE NUMBER OF LOGIC STEPS |
| 4 | B/FF0 | B/FF1 | NG | OK | OK | OK | REDUCTION OF THE NUMBER OF LOGIC STEPS |

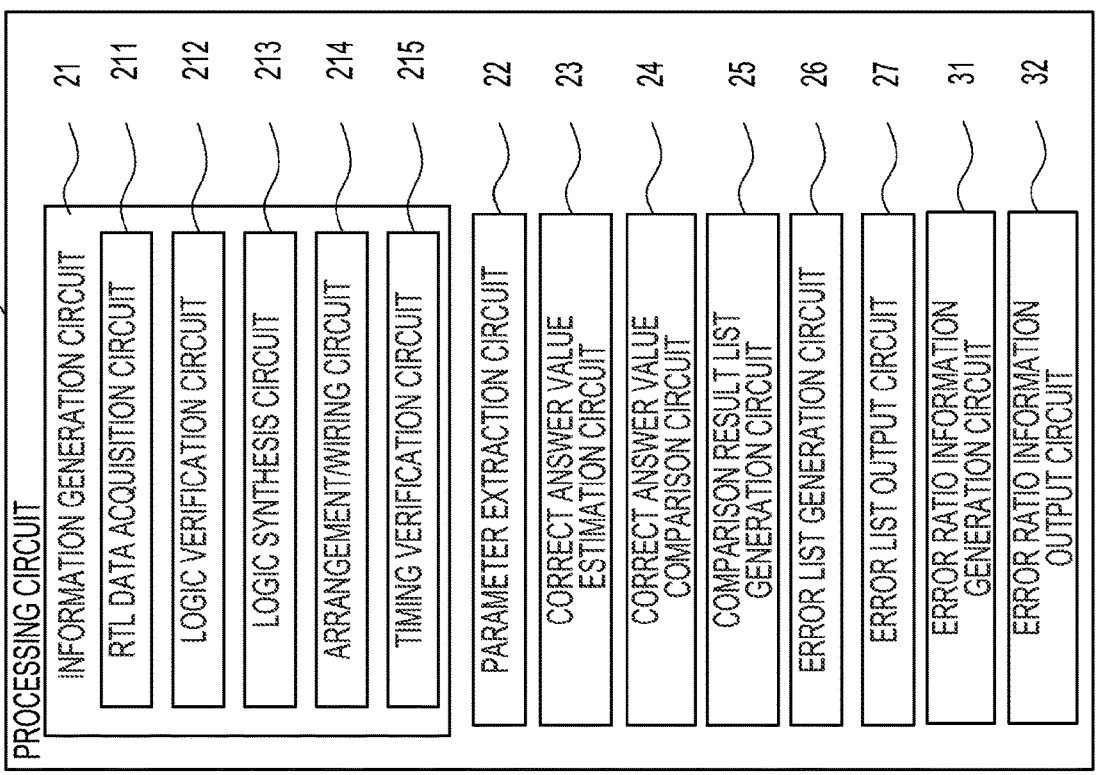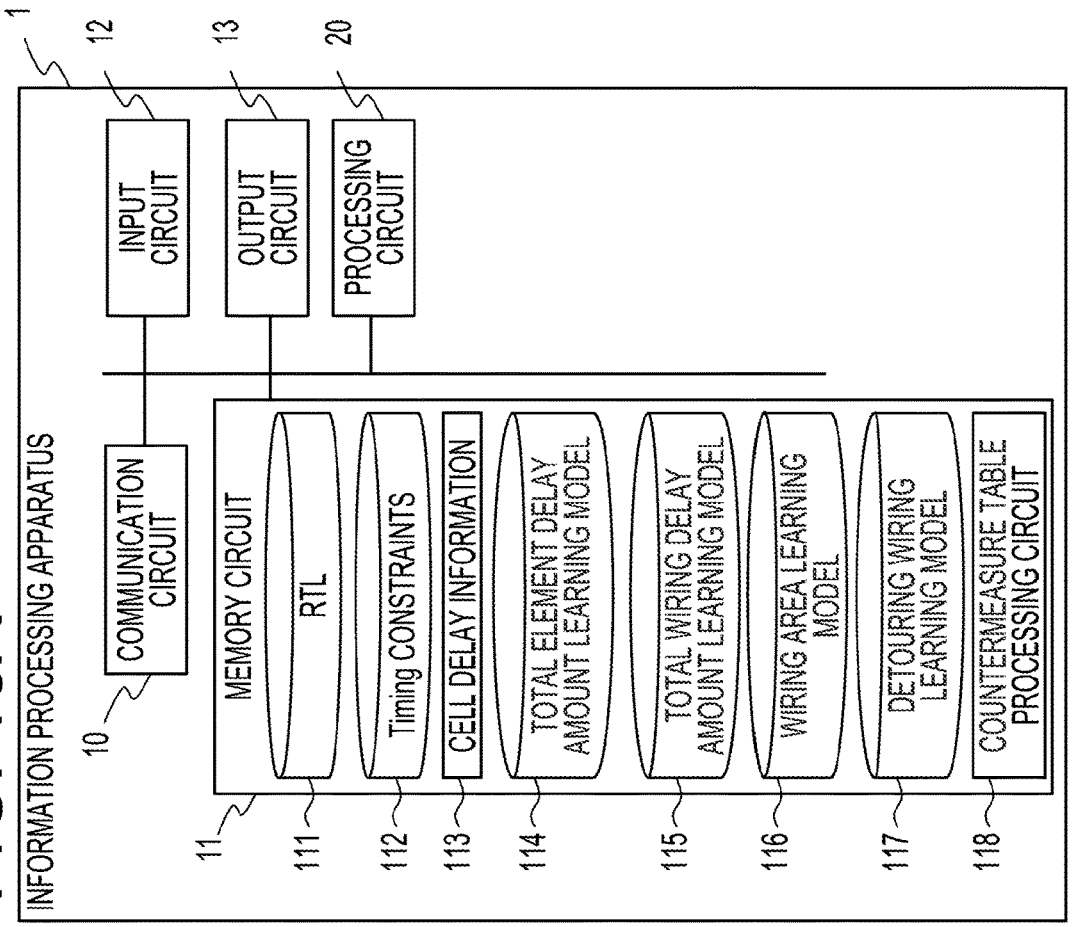

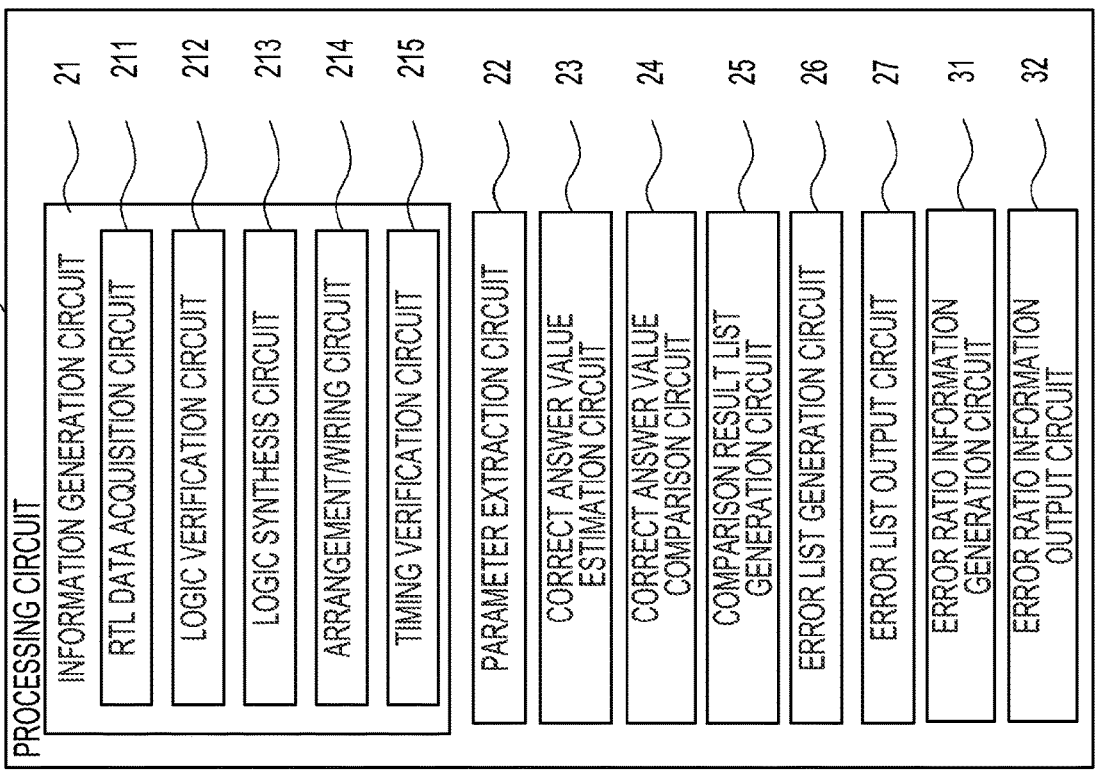
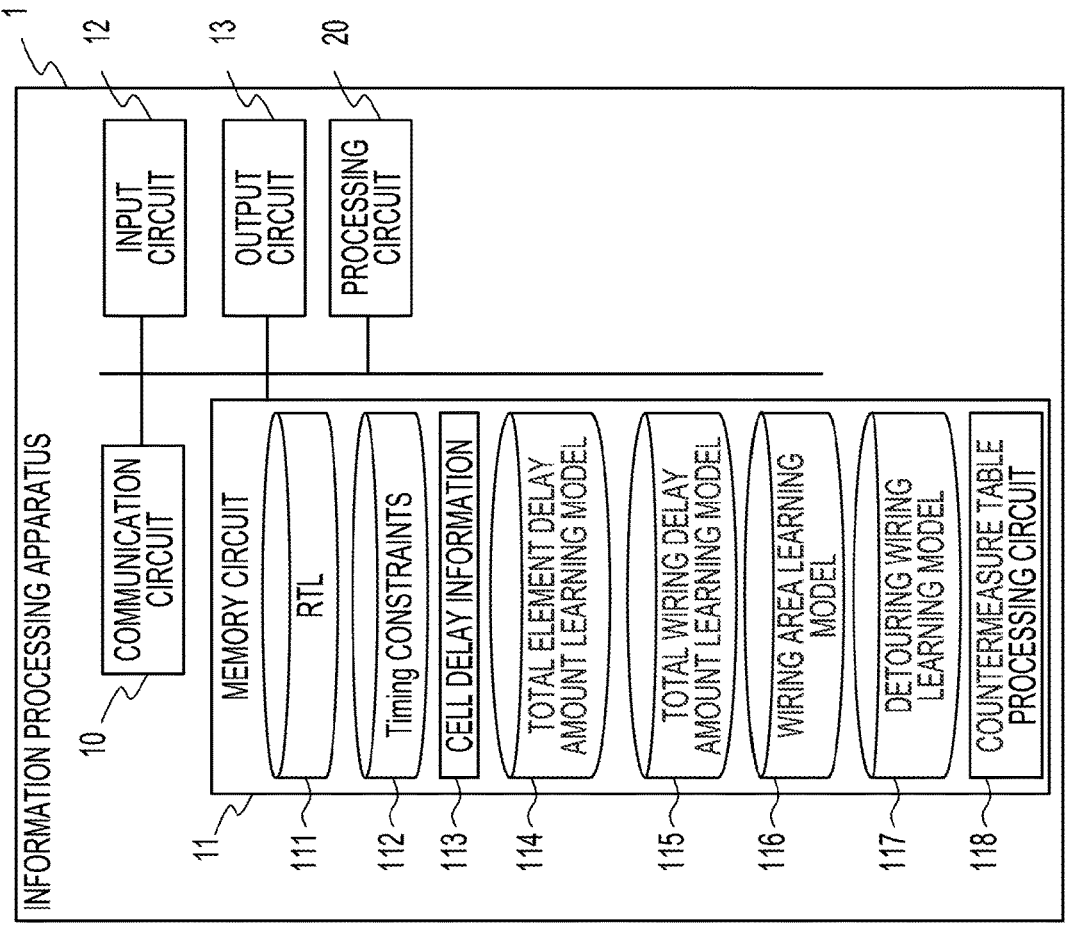

TIMING ERROR ANALYSIS METHOD AND INFORMATION PROCESSING APPARATUS

CROSS-REFERENCE TO RELATED APPLICATION

This application is based upon and claims the benefit of priority of the prior Japanese Patent Application No. 2017-157943, filed on Aug. 18, 2017, the entire contents of which are incorporated herein by reference.

FIELD

The embodiments discussed herein are related to a timing error analysis method and an information processing apparatus.

BACKGROUND

In designing a semiconductor circuit such as a field programmable gate array (FPGA) or the like, there have been known various techniques for facilitating verification of the presence or absence of a timing error of a critical signal path or the like. For example, there has been known a technique for facilitating selection of a signal path by a designer by displaying a calculation result of a delay amount of a signal path as a list on a display unit (see, e.g., Japanese Laid-Open Patent Publication No. 08-278998). In addition, there has been known a technique for facilitating a grasp a range where a critical signal path exists by grouping delay values of wiring in a given range and displaying a bar graph depicting the number of wirings corresponding to the delay values (see, e.g., Japanese Laid-Open Patent Publication No. 2003-030264).

In recent years, as the scale of circuits mounted on a semiconductor device such as an FPGA increases with the progress of miniaturization and higher functionality of the semiconductor device, the number of timing errors occurring at the time of circuit designing increases. Such increase in the number of timing errors may result in a complicated examination on the countermeasures to eliminate the timing error, which may result in an increase in man-hours.

Related techniques are disclosed in, for example, Japanese Laid-Open Patent Publication Nos. 08-278998 and 2003-030264.

SUMMARY

According to an aspect of the embodiments, a timing error analysis method includes, extracting, from error information, a design value related to a delay amount of a signal path and a feature that is an input when a machine learning model learns with the design value as an output, estimating a correct answer value of the design value from the feature and the machine learning model learning a relationship between the design value and the feature, comparing the design value with the correct answer value and storing a comparison result, generating a comparison result list including countermeasures for eliminating the timing error according to the comparison result, aggregating signal paths included in the comparison result list for each design block to generate an error list including information indicating the signal paths aggregated for each of the design blocks and the countermeasures, and outputting the error list.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of error information of a signal path in which a timing error has occurred;

FIG. 4A is a view illustrating an example of a signal path;

FIG. 4B is a view illustrating another example of the signal path;

FIG. 4C is a view illustrating still another example of the signal path;

FIG. 8 is a view for explaining a margin amount of a rectangular detection frame;

FIG. 11 is a view illustrating an example of a comparison result list generated in step S211 illustrated in FIG. 9;

FIG. 13A is a circuit block diagram of an information processing apparatus that executes timing error analysis according to a second embodiment;

FIG. 13B is a functional block diagram of a processing circuit illustrated in FIG. 13A;

FIG. 16A is a circuit block diagram of an information processing apparatus that executes timing error analysis according to a third embodiment;

FIG. 16B is a functional block diagram of a processing circuit illustrated in FIG. 16A;

DESCRIPTION OF EMBODIMENTS

A timing error analysis method and an information processing apparatus will be described below by way of some embodiments with reference to the drawings. However, the technical scope of the present disclosure is not limited to these embodiments.

(General FPGA Design Method)

Prior to describing some embodiments, a general FPGA design method will be described.

Figure 1B:
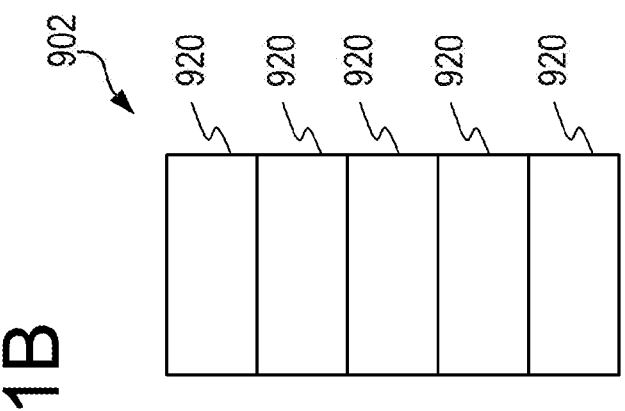
FIG. 1B is an internal block diagram of a CLB illustrated in FIG. 1A.
Figure 1A:
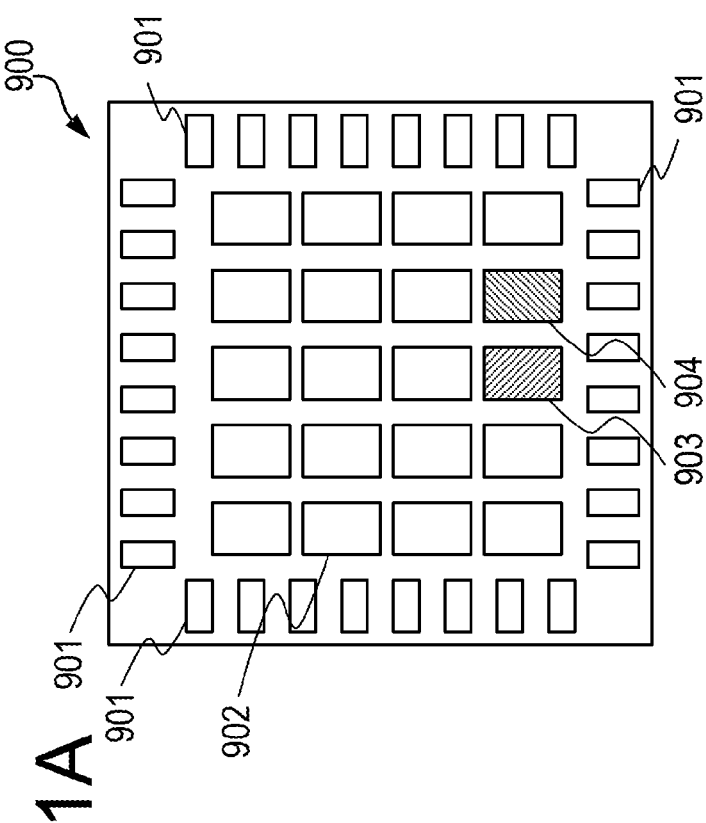
FIG. 1A is a schematic plan view of an FPGA.
Figure 1C:
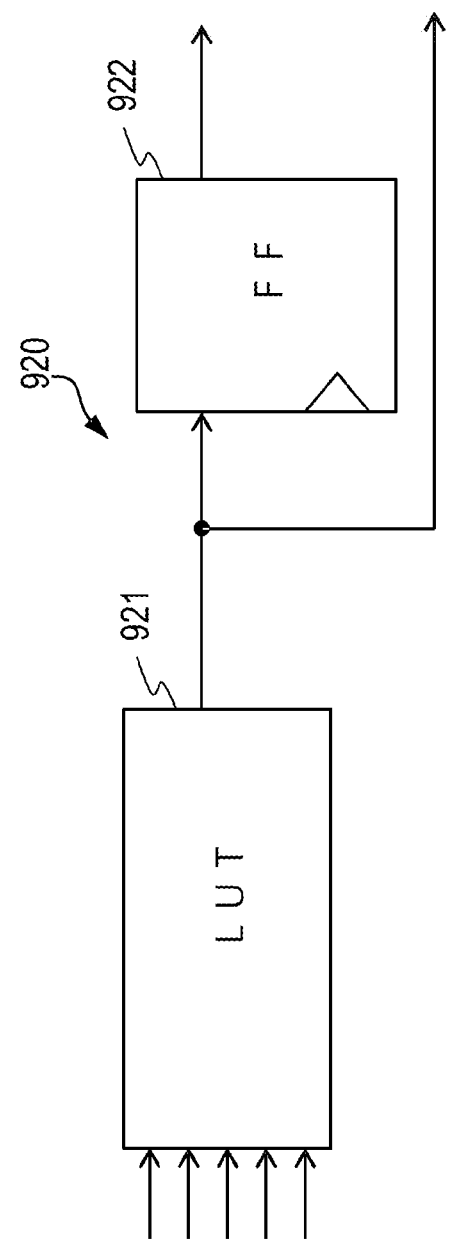
FIG. 1C is an internal block diagram of an LE illustrated in FIG. 1B.

FIG. 1A is a schematic plan view of an FPGA, FIG. 1B is an internal block diagram of a CLB illustrated in FIG. 1A, and FIG. 1C is an internal block diagram of an LE illustrated in FIG. 1B.

An FPGA 900 includes multiple IO blocks 901 arranged along the outer periphery, multiple CLBs 902 arranged in the form of an array in an inner area surrounded by the multiple IO blocks 901, and IP blocks such as a block RAM 903 and a DSP 904. In FIG. 1A, the block RAM 903 is hatched with right down oblique lines and the DSP 904 is hatched with left down oblique lines. A wiring region having wirings and switches connectable with the respective blocks is formed among the IO block 901, the CLB 902, the block RAM 903, and the DSP 904.

Each CLB 902 has multiple logic elements (LEs) 920. Each LE 920 includes a look-up table (LUT) 921 and a flip-flop 922. The LUT 921, which is also referred to as a logic element, is a multi-input and one-output table and is formed with a memory of a size corresponding to the number of inputs. For example, in the case of 5-input and one-output, the LUT 921 is formed with a 32-bit memory. The LUT 921 realizes a desired combinational circuit depending on settings input from the outside during arrangement/wiring processing. The flip-flop 922 latches a signal output from the LUT 921 according to a clock input via the wiring region, and outputs the latched signal to another CLB 902 via the wiring region.

Figure 2:
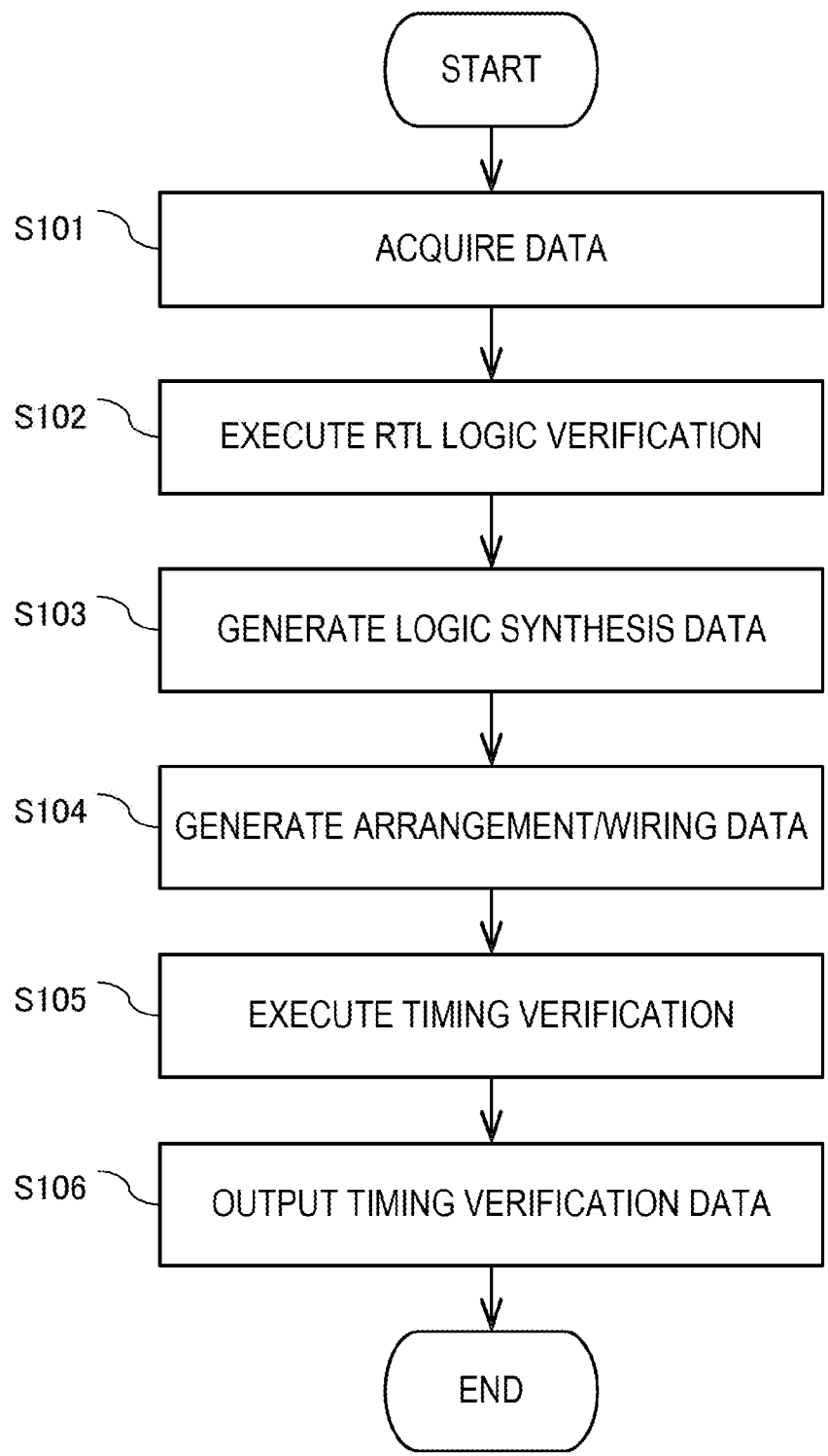
FIG. 2 is a view illustrating an FPGA design process by an information processing apparatus.

FIG. 2 is a view illustrating an FPGA design process by an information processing apparatus (not illustrated). The information processing apparatus is, for example, an electronic computer such as a personal computer. The FPGA design process illustrated in FIG. 2 is mainly executed by a calculation unit such as a central processing unit (CPU) in cooperation with various elements of the information processing apparatus, based on a computer program stored in advance in a memory of the information processing apparatus.

First, the information processing apparatus acquires RTL data indicating an RTL designed by a designer (S101), and executes the logic verification of RTL corresponding to the acquired RTL data (S102). Next, the information processing apparatus executes logic synthesis based on the RTL data on which the logic verification has been executed and timing constraint information to generate logic synthesis data which is also called a net list (S103). The timing constraint information indicates timing constraints of FPGA used by a clock frequency. Next, the information processing apparatus executes a process of arranging and wiring a circuit corresponding to the generated logic synthesis data on the FPGA to generate arrangement/wiring data (S104). Next, the information processing apparatus executes timing verification of arrangement/wiring information corresponding to the arrangement/wiring data (S105), and outputs timing verification data indicating a timing verification result (S106). The designer refers to the timing verification result and makes a modification such as rewriting the RTL to add a flip-flop for each of signal paths in which a timing error has occurred, etc., so as to eliminate the timing errors of the signal paths.

However, as the scale of circuits mounted on a semiconductor device such as an FPGA increases with the progress of miniaturization and higher functionality of the semiconductor device, the number of timing errors occurring at the time of circuit designing increases. Such increase in the number of timing errors may result in a complicated examination on the countermeasures to eliminate the timing error.

FIG. 3 is a view illustrating an example of error information of a signal path in which a timing error has occurred. In FIG. 3, an identifier of a signal path in which a timing error has occurred is "signal path 1," an identifier of an element in the initial stage, that is, the transmitting end, of "signal path 1" is "AAA," and an identifier of an element in the final stage, that is, the receiving end, of "signal path 1" is "BBB." The clock period of a signal passing through the "signal path 1" is 8 [ns], and "violation amount" indicating the magnitude of the timing error is 1.2 [ns].

The designer analyzes the cause of the timing error for each of the signal paths indicated in the error information. In the example illustrated in FIG. 3, first, the designer grasps that the delay increase amount in an element "A," which is an intermediate element between the element "AAA" of the transmitting end and the element "BBB" of the receiving end, is large. Next, the designer focuses on the positional relationship between the elements "AAA" and "BBB" and the element "A." The X coordinate of the element "AAA" is "9" and the X coordinate of the element "BBB" is "17," whereas the X coordinate of the element "A" is "100." Since the element "A" is spaced apart from the elements "AAA" and "BBB," the designer decides that the delay increase amount in the element "A" became large and a timing error has occurred in the "signal path 1," and changes the design so as to change the arrangement of the element "A."

Since the designer executes an analysis on each of the signal paths indicated in the error information, the analysis time becomes enormous as the number of buses in which timing errors have occurred increases. For example, since it is not easy for a single designer to execute the analysis processing of several thousand signal paths, each of multiple designers executes the timing error analysis processing of several hundred signal paths.

(Overview of Information Processing Apparatus According to Embodiment)

An information processing apparatus according to an embodiment extracts a design value related to the delay amount of a signal path in which a timing error has occurred, and a feature, which is an input when the design value is learned by a machine learning model, from the error information including the delay amount of the signal path and the arrangement/wiring information of the element included in the signal path. Next, the information processing apparatus according to the embodiment compares a correct answer value of the design value estimated from the feature and the machine learning model that learned the relationship between the design value and the feature with the design value, and generates a comparison result list including countermeasures for eliminating the timing error based on the comparison result. Then, the information processing apparatus according to the embodiment aggregates the signal paths included in the comparison result list for each design block, and outputs an error list including information indicating the signal paths aggregated for each design block and countermeasures.

Specifically, the information processing apparatus according to the embodiment separates the delay amount of a signal path into the total element delay amount and the total wiring delay amount, and executes the timing error analysis. The total element delay amount is the total delay amount of an element included in the signal path and the total wiring delay amount is the total delay amount by a wiring included in the signal path. As illustrated in FIG. 4A, the total element delay amount increases as the number of stages of elements included in the signal path increases. In addition, the information processing apparatus according to the embodiment again separates the total wiring delay amount into an element arrangement area factor depending on the arrangement area of the element included in the signal path and a wiring detouring factor depending on the total wiring length of the wiring included in the signal path, and performs the timing error analysis. As illustrated in FIG. 4B, the element arrangement area factor increases when the elements included in the signal path are spaced apart from each other. As illustrated in FIG. 4C, the wiring detouring factor increases when the wiring becomes long due to detouring or the like.

Since the information processing apparatus according to the embodiment generates an error list in which signal paths included in the result of comparison between the correct answer value of the design value estimated by the machine learning model and the design value are aggregated for each design block, it is easier to examine the countermeasures for eliminating the timing error. That is, since the designer is able to grasp the tendency of the timing error by visually checking the result of comparison between the correct answer value of the design value estimated by the learning model and the design value, it is easy to examine the work estimate or the like. Specifically, when it is determined that the timing error of the signal path is caused by the total element delay amount, the information processing apparatus according to the embodiment presents countermeasures to reduce the total element delay amount of the signal path to the designer. In addition, when it is determined that the timing error of the signal path is caused by the element arrangement area factor, the information processing apparatus according to the embodiment presents countermeasures to remove the element arrangement area factor of the signal path to the designer. In addition, when it is determined that the timing error of the signal path is caused by the wiring detouring factor, the information processing apparatus according to the embodiment presents countermeasures to remove the wiring detouring factor of the signal path to the designer.

In addition, in the error list, since the signal paths included in the result of comparison with the design value are aggregated for each design block, each designer is able to easily grasp the tendency of a timing error of a design block designed by the designer and thus it is possible to reduce the number of man-hours for examining the countermeasures for the timing error. Specifically, since the information processing apparatus according to the embodiment aggregates and outputs the error lists for each design block, the designers is able to easily grasp the tendency of the timing errors in the design blocks designed by the multiple designers.

Figure 5:
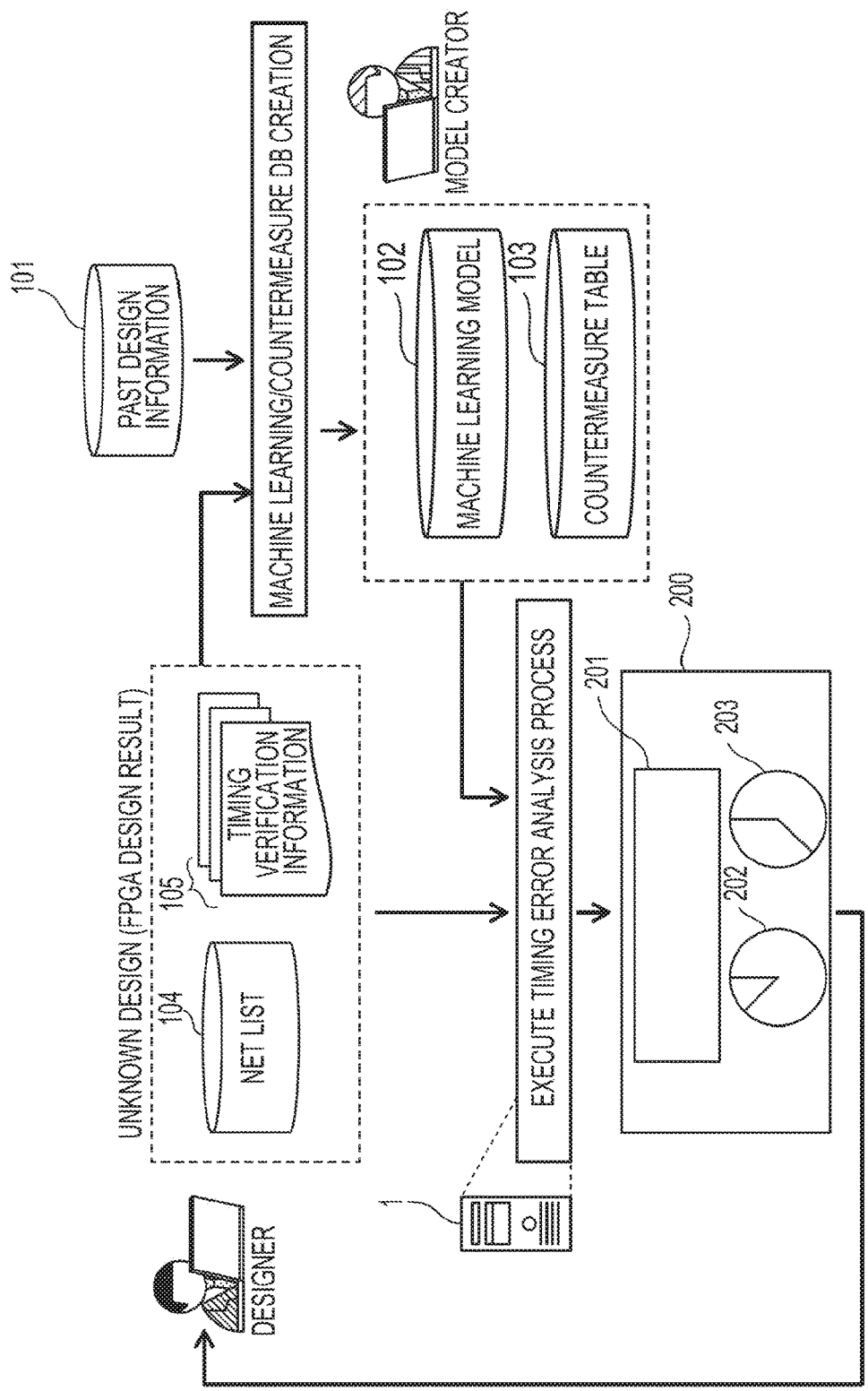
FIG. 5 is an explanatory view for explaining timing error analysis according to an embodiment.

FIG. 5 is an explanatory view for explaining timing error analysis according to an embodiment. A model creator creates a machine learning model 102 and a countermeasure table 103 based on past design information 101 including FPGA arrangement/wiring information. The model creator is, for example, a provider of the information processing apparatus 1. The model creator may be the same as a designer who designs a target circuit. The designer inputs a newly designed net list 104 and timing verification information 105 indicating a timing verification result to the information processing apparatus 1.

Then, the information processing apparatus 1 analyzes the cause of the timing error based on the input net list 104, the timing verification information 105, the created machine learning model 102, and the countermeasure table 103. Then, the information processing apparatus 1 outputs a report 200. The report 200 includes an error list 201, first error ratio information 202, and second error ratio information 203. The error list 201 includes at least signal paths aggregated for each design block and countermeasures for eliminating timing errors of the respective signal paths. The first error ratio information 202 is a pie chart indicating the ratio of a signal path in which an error has occurred due to the total element delay amount to a signal path in which an error has occurred due to the total wiring delay amount in the signal paths included in the error list. The second error ratio information 203 is a pie chart indicating the ratio of a signal path in which an error has occurred due to the element arrangement area factor to a signal path in which an error has occurred due to the wiring detouring factor in the signal path in which an error has occurred due to the total wiring delay amount.

The designer modifies the net list so that no timing error occurs, based on the countermeasures indicated in the error list 201, and the ratios indicated in the first error ratio information 202 and the second error ratio information 203.

(Configuration and Function of Information Processing Apparatus Executing Timing Error Analysis According to First Embodiment)

Figure 6B:
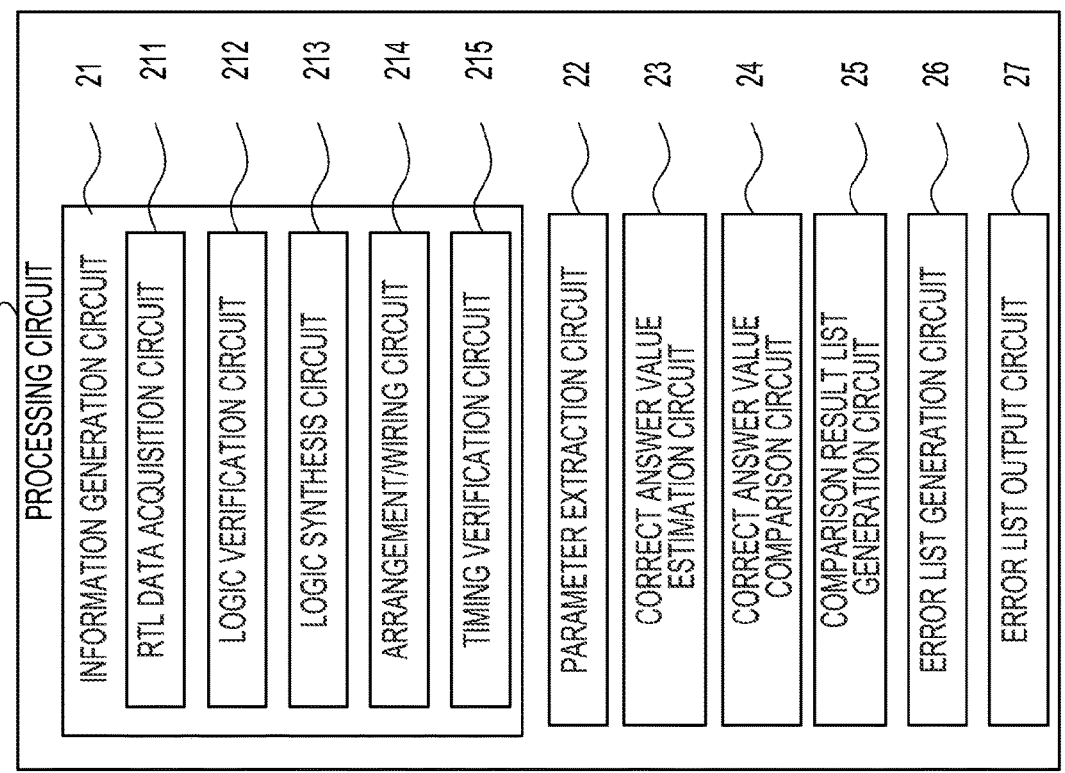
FIG. 6B is a functional block diagram of a processing circuit illustrated in FIG. 6A.
Figure 6A:
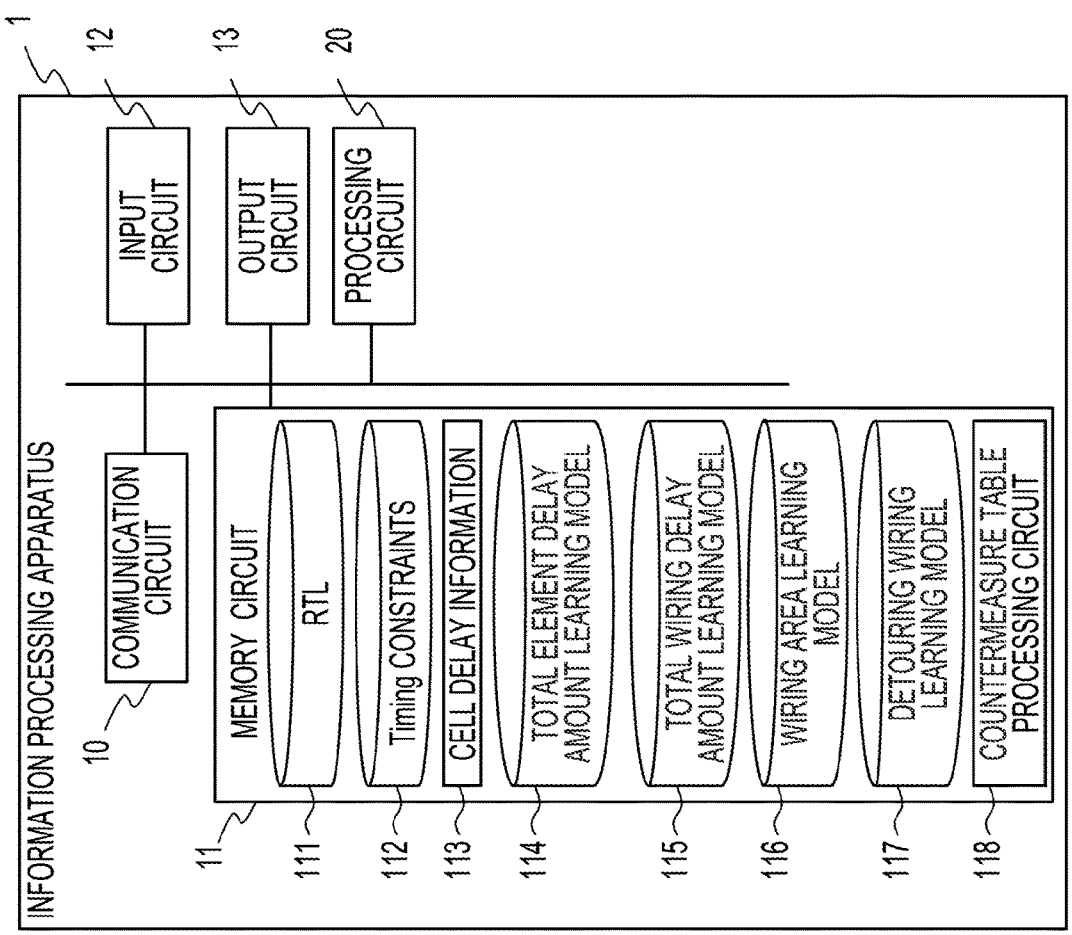
FIG. 6A is a circuit block diagram of an information processing apparatus that executes timing error analysis according to a first embodiment.

FIG. 6A is a circuit block diagram of an information processing apparatus that executes a timing error analysis according to a first embodiment and FIG. 6B is a functional block diagram of a processing circuit illustrated in FIG. 6A.

The information processing apparatus 1 includes a communication circuit 10, a memory 11, an input circuit 12, an output circuit 13, and a processing circuit 20.

The communication circuit 10 communicates with a server (not illustrated) or the like via the Internet according to a protocol of Hypertext Transfer Protocol (HTTP). Then, the communication circuit 10 supplies data received from the server or the like to the processing circuit 20. Further, the communication circuit 10 transmits data supplied from the processing circuit 20 to the server or the like.

The memory 11 includes at least one of, for example, a magnetic tape device, a magnetic disk device, and an optical disk device. The memory 11 stores an operating system program, a driver program, an application program, data and the like to be used for processing in the processing circuit 20. For example, the memory 11 stores, as the application program, a timing error analysis program for executing timing error analysis of the FPGA. The timing error analysis program may be installed in the memory 11 from a computer-readable portable recording medium such as a CD-ROM, a DVD-ROM or the like using a known setup program or the like.

In addition, the memory 11 stores various data to be used in the timing error analysis process. Further, the memory 11 may temporarily store temporary data related to a predetermined process. The memory 11 stores an RTL 111 describing the logic of a circuit mounted on the FPGA, timing constraint information 112 describing timing constraints of the FPGA such as a clock frequency, and element delay information 113 indicating the element delay amount of each device of the FPGA. The memory 11 further stores a total element delay amount learning model 114, a total wiring delay amount learning model 115, a wiring area learning model 116, a detouring wiring learning model 117, and a countermeasure table 118. The models from the total element delay amount learning model 114 to the detouring wiring learning model 117 are a specific example of the machine learning model 102 illustrated in FIG. 5, and the countermeasure table 118 is a specific example of the countermeasure table 103 illustrated in FIG. 5.

Each of the models from the total element delay amount learning model 114 to the detouring wiring learning model 117 is a learning machine in which supervised learning has been executed, and is implemented by, for example, a regression type support vector machine or other algorithms. The regression type support vector machine is described in "Support Vector Machine" (written by Takashi Onoda, edited by Artificial Intelligence Society, and published on Aug. 20, 2007), etc., and therefore, detailed explanation thereof is omitted for the sake of brevity.

Each of the models from the total element delay amount learning model 114 to the detouring wiring learning model 117 is supervised-learning based on the arrangement/wiring data of the FPGA designed in the past. A feature when each of the models from the total element delay amount learning model 114 to the detouring wiring learning model 117 is supervised-learning may include the length or frequency of one cycle of a clock. The feature when the models from the total element delay amount learning model 114 to the detouring wiring learning model 117 are supervised-learning may further include the arrangement/wiring information indicating respective arrangement positions on the FPGA of a transmitting element in the first stage of a signal path, an intermediate element included in the middle of the signal path, and a receiving element in the final stage of the signal path. The feature when the models from the total element delay amount learning model 114 to the detouring wiring learning model 117 are supervised-learning may further include other information such as information indicating the operation conditions of the FPGA such as the operation temperature. Each of the models from the total element delay amount learning model 114 to the detouring wiring learning model 117 executes the supervised learning using an appropriately selected feature.

Figure 7A:
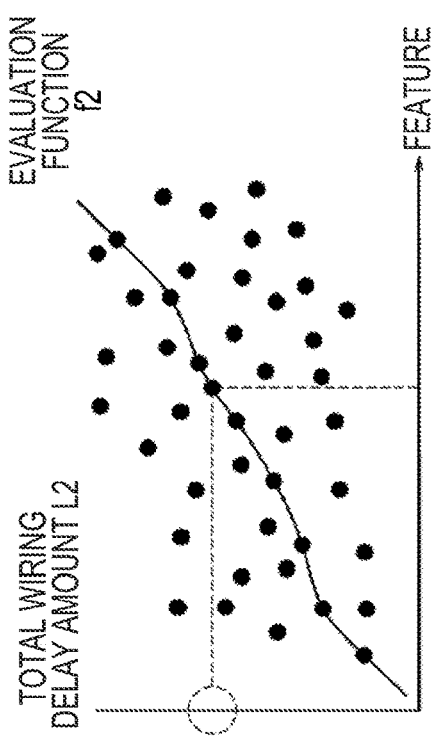
FIG. 7A is a view for explaining an total element delay amount learning model illustrated in FIG. 6A.

A label when the total element delay amount learning model 114 is supervised-learning is the element delay amount of the transmitting element and the total element delay amount of the LUT included in the signal path. An example of the wiring area learning model 116 is described in Japanese Patent Application No. 2017-109513. The total element delay amount learning model 114 generates a predetermined evaluation function by supervised-learning using a feature and a label extracted from the arrangement/wiring data of an FPGA designed in the past. As illustrated in FIG. 7A, the total element delay amount learning model 114 extracts the feature of the signal path from the arrangement/wiring data and the like, and outputs the total element delay amount according to the extracted feature based on the evaluation function. In the example illustrated in FIG. 7A, the total element delay amount learning model 114 outputs the total element delay amount L1 according to n features $C1_1$ to $C1_n$ based on an evaluation function f1.

Figure 7B:
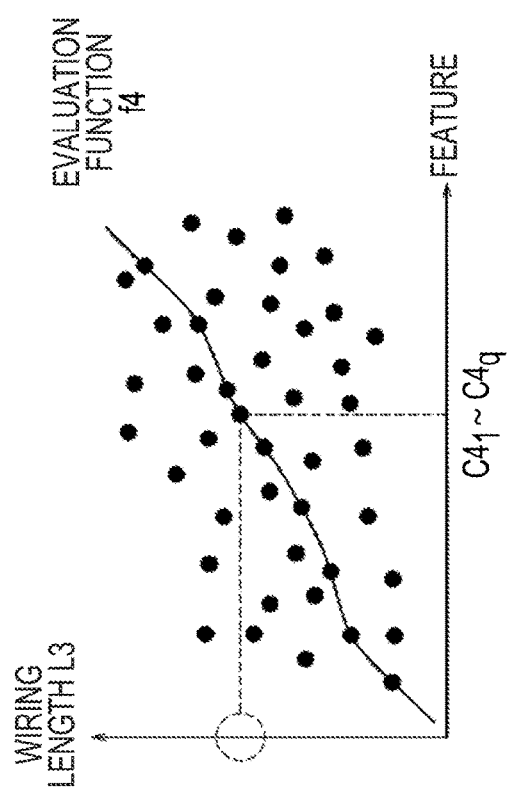
FIG. 7B is a view for explaining a total wiring delay amount learning model illustrated in FIG. 6A.

A label when the total wiring delay amount learning model 115 is supervised-learning is the total wiring delay amount indicating the delay amount of the wiring arranged between the transmitting element and the receiving element. The total wiring delay amount learning model 115 generates a predetermined evaluation function by supervised-learning using a feature and a label extracted from the arrangement/wiring data of an FPGA designed in the past. As illustrated in FIG. 7B, the total wiring delay amount learning model 115 extracts the feature of the signal path from the arrangement/wiring data and the like, and outputs the total wiring delay amount according to the extracted feature based on the evaluation function. In the example illustrated in FIG. 7B, the total wiring delay amount learning model 115 outputs the total wiring delay amount L2 according to n features $C2_1$ to $C2_m$ based on an evaluation function f2.

A label when the wiring area learning model 116 is supervised-learning is a margin amount of a detection frame in which an intermediate element included in a signal path can be arranged, with respect to a provisional detection frame determined based on the arrangement positions of the transmitting element and the receiving element.

FIG. 8 is a view for explaining a margin amount of a rectangular detection frame. A provisional detection frame 801 is a frame that defines a region including both a transmitting element and a receiving element. The provisional detection frame 801 may be a rectangular frame as illustrated in FIG. 8, or it may be a circular frame. In the example of FIG. 8, the margin amount is "×2." That is, "d0/2=d1×2," and a detection frame 802 has an area twice as large as the provisional detection frame 801.

In the detection frame 802, the provisional detection frame 801 is evenly enlarged in the plus direction and the minus direction of the x-axis, and the provisional detection frame 801 is evenly enlarged in the x-axis and the y-axis, but the present disclosure is not limited thereto. For example, the ratio between the plus direction and the minus direction of the x axis, the ratio between the x axis and the y axis, and the like may be varied depending on the operation input by a user.

Figure 7C:
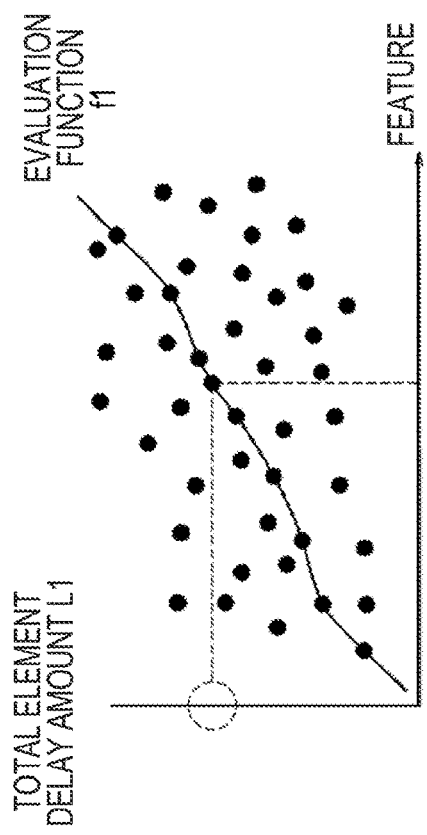
FIG. 7C is a view for explaining a wiring region learning model illustrated in FIG. 6A.

The wiring area learning model 116 generates a predetermined evaluation function by supervised-learning using a feature and a label extracted from the arrangement/wiring data of an FPGA designed in the past. An example of the wiring area learning model 116 is described in Japanese Patent Application No. 2017-004673. As illustrated in FIG. 7C, the wiring area learning model 116 extracts the feature of the signal path from the arrangement/wiring data and the like, and outputs a margin amount corresponding to the extracted feature based on the evaluation function. In the example illustrated in FIG. 7C, the wiring area learning model 116 outputs a margin amount L3 corresponding to p features $C3_1$ to $C3_p$ based on an evaluation function f3.

Figure 7D:
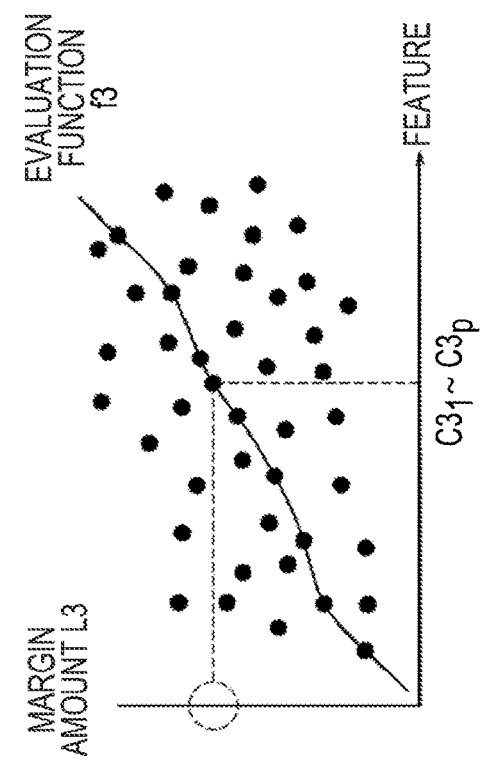
FIG. 7D is a view for explaining a detouring wiring learning model illustrated in FIG. 6A.

A label when the detouring wiring learning model 117 is supervised-learning is the total wiring length of the wiring included in a signal path. The detour wiring learning model 117 generates a predetermined evaluation function by supervised-learning using a feature and a label extracted from the arrangement/wiring data of an FPGA designed in the past. As illustrated in FIG. 7D, the detouring wiring learning model 117 extracts the feature of the signal path from the arrangement/wiring data and the like, and outputs the wiring length corresponding to the extracted feature based on the evaluation function. In the example illustrated in FIG. 7D, the detouring wiring learning model 117 outputs the wiring length L4 corresponding to q features $C1_1$ to $C1_q$ based on an evaluation function f4.

The countermeasure table 118 stores the cause of the timing error and the countermeasures for eliminating the timing error in association. An identifier indicating that a larger total element delay amount is the cause of the timing error is stored in association with a character string "reduction of the number of logical steps." An identifier indicating that the arrangement position of a signal path is the cause of the timing error is stored in association with a character string "reduction of arrangement area." An identifier indicating that inclusion of a detouring wiring is the cause of the timing error is stored in association with a character string "enlargement of arrangement area."

The input circuit 12 may be any device as long as data can be input, such as a touch panel, a key button or the like. An operator may use the input circuit 12 to input letters, numbers, symbols and the like. When operated by the operator, the input circuit 12 generates a signal corresponding to the operation. Then, the generated signal is supplied to the processing circuit 20 as an instruction of the operator.

The output circuit 13 may be any device as long as images, frames and the like can be displayed, such as a liquid crystal display, an organic electro-luminescence (EL) display or the like. The output circuit 13 displays images corresponding to image data supplied from the processing circuit 20, frames according to moving image data, and the like.

The processing circuit 20 has one or more processors and peripheral circuits. The processing circuit 20 generally controls the overall operation of the information processing apparatus 1 and is, for example, a CPU. The processing circuit 20 executes a process based on programs (the driver program, the operating system program, and the application program, etc.) stored in the memory 11. Further, the processing circuit 20 may execute multiple programs (application programs, etc.) in parallel.

The processing circuit 20 includes an error information generation circuit 21, a parameter extraction circuit 22, a correct answer value estimation circuit 23, a correct answer value comparison circuit 24, a comparison result list generation circuit 25, an error list generation circuit 26, and an error list output circuit 27. The error information generation circuit 21 includes an RLT data acquisition unit 211, a logic verification unit 212, a logic synthesis unit 213, an arrangement/wiring unit 214, and a timing verification unit 215. Each of these units is a functional module implemented by a program executed by a processor included in the processing circuit 20. Alternatively, these units may be mounted on the information processing apparatus 1 as firmware.

(Timing Error Analysis Process by Information Processing Apparatus According to First Embodiment)

Figure 9:
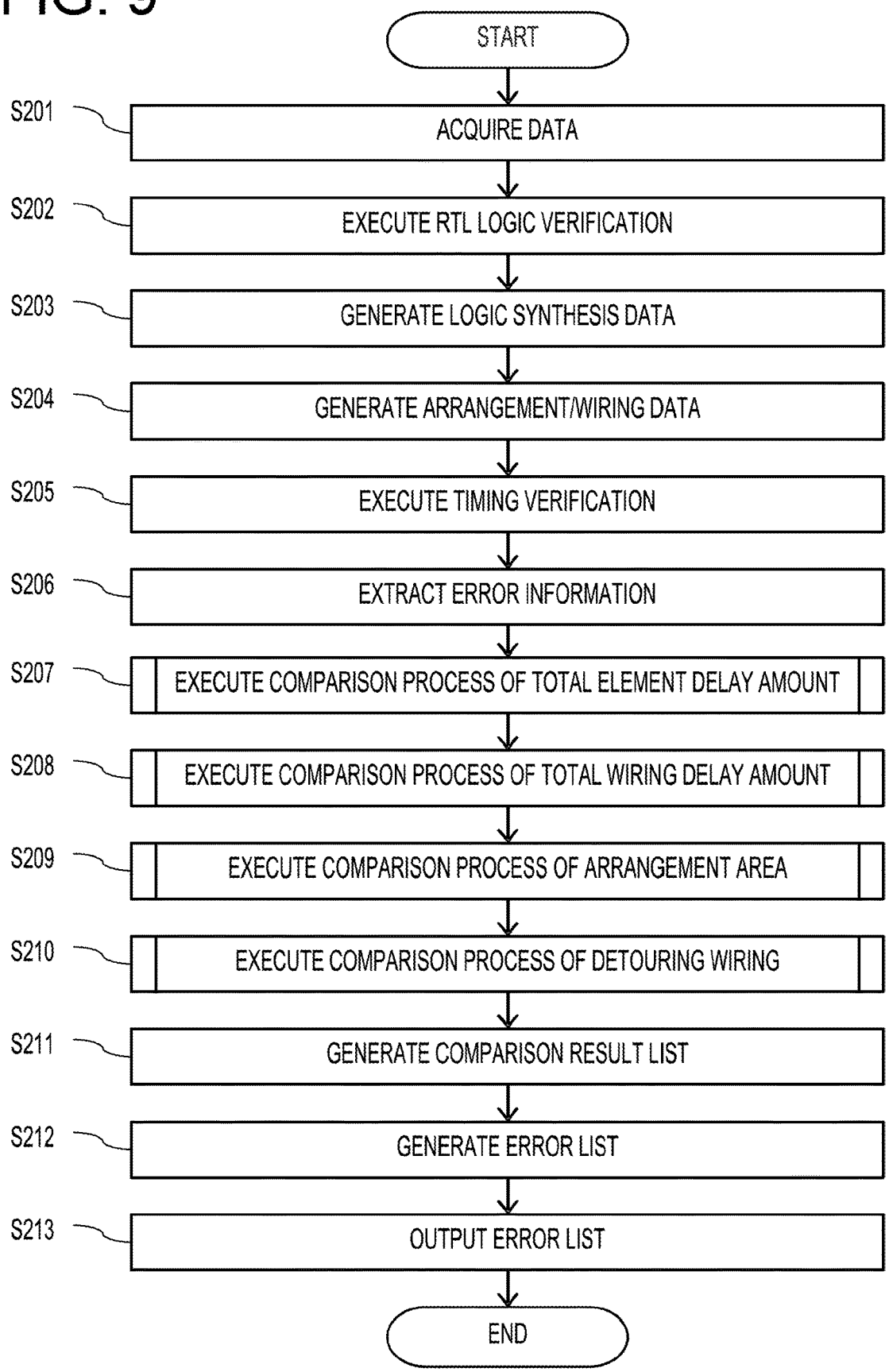
FIG. 9 is a flowchart of a timing error analysis process by the information processing apparatus illustrated in FIG. 6A.
Figure 10:
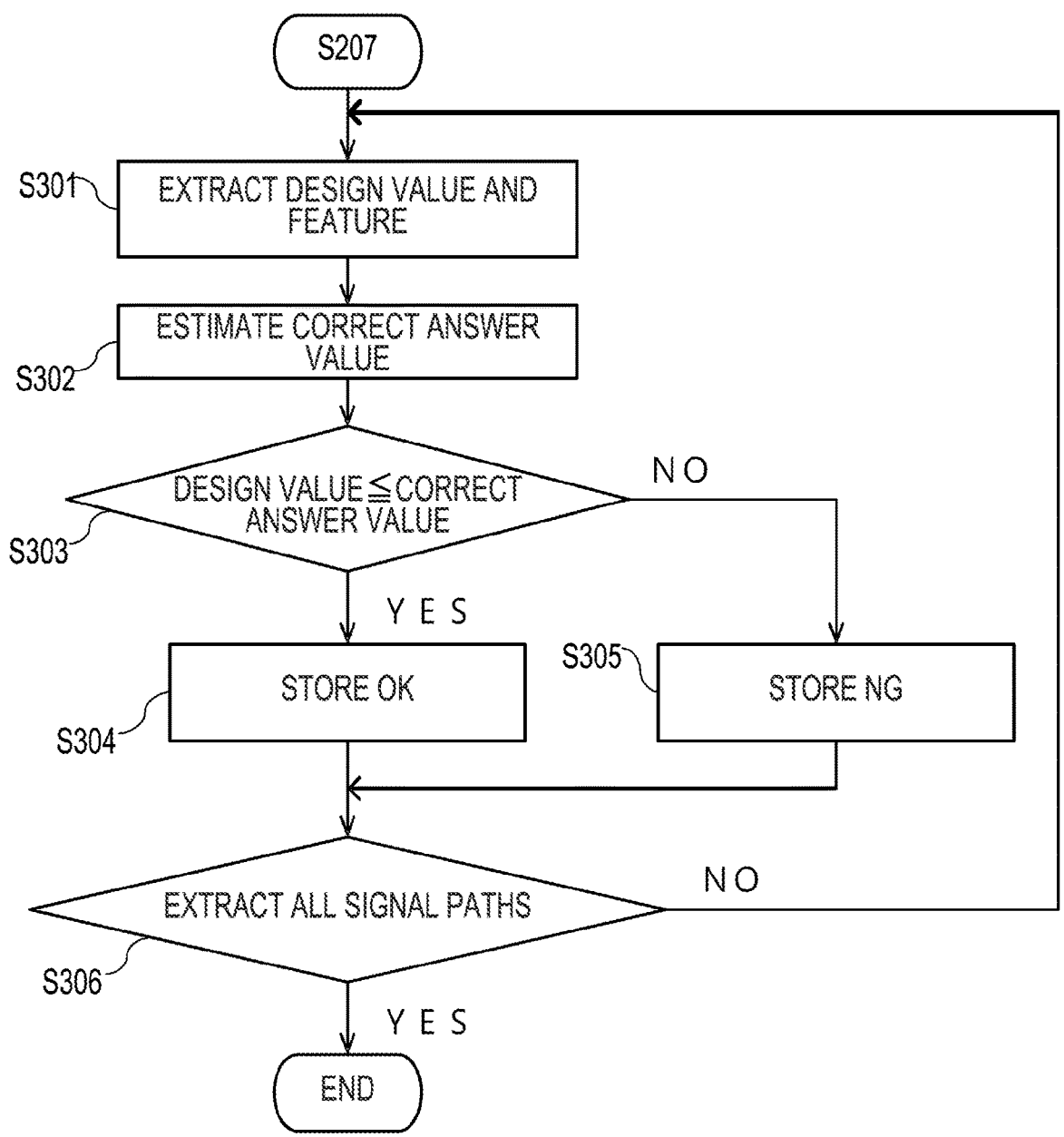
FIG. 10 is a flowchart illustrating more details of step S207 illustrated in FIG. 9.

FIG. 9 is a flowchart of a timing error analysis process by the information processing apparatus 1 and FIG. 10 is a flowchart illustrating more details of step S207 illustrated in FIG. 9. The timing error analysis process illustrated in FIG. 9 is executed mainly by the processing circuit 20 in cooperation with each element of the information processing apparatus 1 based on the programs stored in advance in the memory 11.

First, the RLT data acquisition unit 211 acquires RTL data indicating an RTL designed by a designer (S201). Next, the logic verification unit 212 executes logic verification of RTL corresponding to the RTL data acquired in step S101 according to an instruction from designer via the input circuit 12 (S202). Next, the logic synthesis unit 213 executes logic synthesis based on the RTL data on which the logic verification has been executed in step S202 and the timing constraint information 112 to generate logic synthesis data (S203). Next, the arrangement/wiring unit 214 executes a process of arranging and wiring a circuit corresponding to the logic synthesis data generated in step S203 on an FPGA to generate arrangement/wiring data indicating arrangement/wiring information (S204). The arrangement/wiring information includes information on the arrangement positions of multiple elements arranged and wired on the FPGA and the wiring between the multiple elements. Next, the timing verification unit 215 executes a timing verification of the arrangement/wiring information corresponding to the arrangement/wiring data generated in step S204 (S205), and stores timing verification information indicating the timing verification result in the memory 11. The timing verification information includes information indicating a signal path in which a timing error has occurred. Since the operations of steps S201 to S205 is well known, detailed explanation thereof will be omitted.

Next, the parameter extraction circuit 22 acquires error information including the delay amount of the signal path in which the timing error has occurred and the arrangement/wiring information of an element included in the signal path (S206). Specifically, the parameter extraction circuit 22 acquires error information included in the timing verification information stored in the memory 11 in step S205.

Next, the parameter extraction circuit 22, the correct answer value estimation circuit 23, and the correct answer value comparison circuit 24 execute a comparison process of comparing a design value of the total element delay amount with a correct answer value (S207).

More specifically, first, the parameter extraction circuit 22 extracts a design value related to the delay amount of the signal path and a feature, which is an input when a machine learning model learns with the design value as an output, from the error information acquired in step S206 (S301). Specifically, the parameter extraction circuit 22 extracts the total element delay amount and a feature which is an input when the total element delay amount learning model 114 learns with the total element delay amount as an output. Next, the correct answer value estimation circuit 23 estimates a correct answer value of the design value from the feature and the machine learning model that has learned the relationship between the design value and the feature in the signal path extracted in step S301 (S302). Specifically, the correct answer value estimation circuit 23 estimates a correct answer value of the total element delay amount by inputting the feature extracted in step S301 to the total element delay amount learning model 114.

Next, the correct answer value comparison circuit 24 compares the design value with the correct answer value and stores a comparison result. Specifically, the correct answer value comparison circuit 24 compares the design value of the total element delay amount extracted in step S301 with the correct answer value of the total element delay amount estimated in step S302 (S303). When the design value of the total element delay amount extracted in step S301 is equal to or smaller than the correct answer value of the total element delay amount estimated in step S302, the correct answer value comparison circuit 24 stores, as a comparison result, "OK" indicating that the design value of the total element delay amount is not an error (S304). When the design value of the total element delay amount is larger than the correct answer value of the total element delay amount, the correct answer value comparison circuit 24 stores, as a comparison result, element delay error information "NG" indicating that the design value of the total element delay amount is the cause of the timing error (S305). When storing the element delay error information "NG" as the comparison result, the correct answer value comparison circuit 24 stores a path identifier in association with an identifier indicating that a large total element delay amount is the cause of the timing error. In addition, as described in Japanese Patent Application No. 2017-109513, the correct answer value comparison circuit 24 may estimate the delay amount of only LUT included in the signal path as the total element delay amount.

Next, the parameter extraction circuit 22 determines whether or not information has been extracted for all signal paths included in the timing verification information (S306). The operations of steps S301 to S306 are repeated until it is determined that information has been extracted for all the signal paths by the parameter extraction circuit 22 (YES in S306). When it is determined that information has been extracted for all the signal paths by the parameter extraction circuit 22 (YES in S306), the comparison process in step S207 is ended.

Next, the parameter extraction circuit 22, the correct answer value estimation circuit 23, and the correct answer value comparison circuit 24 execute a comparison process of comparing a design value of the total wiring delay amount with a correct answer value (S208). Next, the parameter extraction circuit 22, the correct answer value estimation circuit 23, and the correct answer value comparison circuit 24 execute a comparison process of comparing a design value of the margin amount of a detection frame in which an intermediate element can be arranged with a correct answer value (S209). Next, the parameter extraction circuit 22, the correct answer value estimation circuit 23, and the correct answer value comparison circuit 24 execute a comparison process of comparing a design value of the wiring length of the total signal path with a correct answer value (S210).

Since the operations of steps S208 to S210 are the same as the operation of step S207 except for the object of a comparison process and a machine learning model used, explanation of more details of steps S208 to S210 is omitted for the sake of brevity. When the design value of the total wiring delay amount is larger than the correct answer value of the total wiring delay amount, the correct answer value comparison circuit 24 stores, as a comparison result, the wiring delay error information "NG" indicating that the design value of the total wiring delay amount is the cause of the timing error. When the design value of the margin amount of the detection frame in which the intermediate element can be arranged is larger than the correct answer value of the margin amount of the detection frame, the correct answer value comparison circuit 24 stores, as a comparison result, the arrangement area error information "NG" indicating that the design value of the margin amount of the detection frame is the cause of the timing error. The correct answer value comparison circuit 24 may execute a comparison process as described in Japanese Patent Application No. 2017-004673. When the design value of the wiring length of the total signal path is larger than the correct answer value of the wiring length of the total signal path, the correct answer value comparison circuit 24 stores, as a comparison result, the wiring delay error information "NG" indicating that the design value of the total wiring delay amount is the cause of the timing error.

Next, the comparison result list generation circuit 25 generates a comparison result list including countermeasures for eliminating the timing error according to the comparison result in the comparison process of steps S207 to S210 (S211).

FIG. 11 is a view illustrating an example of a comparison result list generated in step S211.

A comparison result list 1100 includes an identifier of a signal path, an identifier of a transmitting element, an identifier of a receiving element, a comparison result and countermeasures. In one example, the comparison result list 1100 is a CSV format file. The identifier of the signal path is a number from 1 to 4 in the example of FIG. 11. The identifier of the transmitting element is an identifier of an element in the initial stage of a signal path included in the comparison result list 1100 and the identifier of the receiving element is an identifier of an element in the final stage of a signal path included in the comparison result list 1100. The comparison result is the comparison result stored by the comparison process in steps S207 to S211 and the countermeasures are countermeasures according to the comparison result. The countermeasures are a character string associated with an identifier of a timing error associated with the comparison process in steps S207 to S211 by referring to the countermeasure table 118.

Next, the error list generation circuit 26 aggregates signal paths included in the comparison result list for each design block and generates an error list including information indicating the signal paths aggregated for each design block and the countermeasures (S212).

Figure 12A:
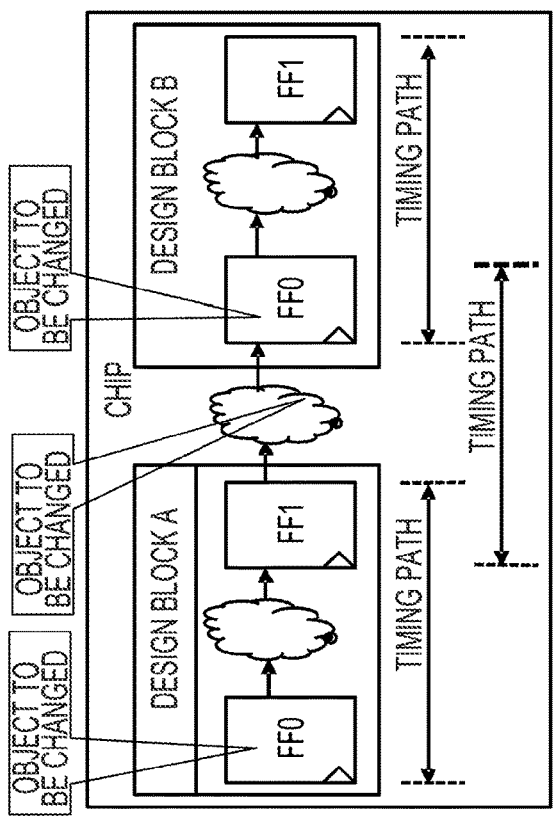
FIG. 12A is a view illustrating an example of an error list generated in step S212.
Figure 12B:
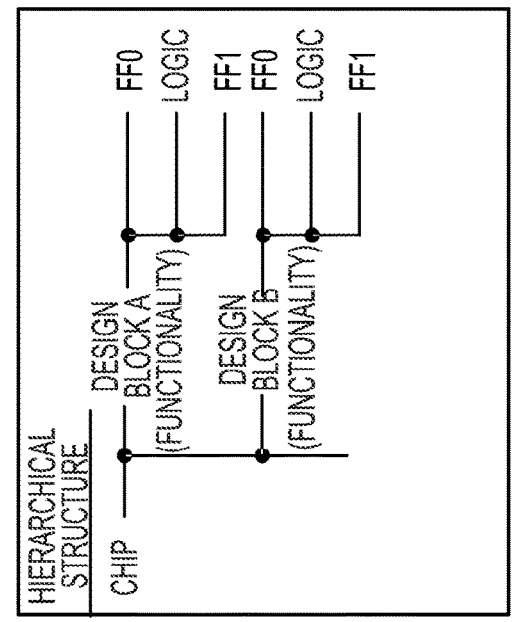
FIG. 12B is a view for explaining the error list illustrated in FIG. 9A.

FIG. 12A is a view illustrating an example of an error list generated in step S212 and FIG. 12B is a view for explaining the error list illustrated in FIG. 12A.

An error list 1200 includes a first error list 1201, a second error list 1202 and a third error list 1203. The first error list 1201 is an error list that aggregates signal paths included in a design block A illustrated in FIG. 12B, and the second error list 1202 is an error list that aggregates signal paths included in a design block B illustrated in FIG. 12B. The third error list 1203 is an error list that aggregates signal paths connecting the design block A and the design block B illustrated in FIG. 12B. The error list generation circuit 26 estimates a design block to be aggregated from, for example, the identifier of the transmitting element and the identifier of the receiving element. For example, the error list generation circuit 26 estimates a signal path in which both the identifiers of the transmitting element and the receiving element start with "A/" as a signal path included in the design block A. In addition, the error list generation circuit 26 estimates a signal path in which both the identifiers of the transmitting element and the receiving element start with "B/" as a signal path included in the design block B. Then, the error list generation circuit 26 estimates a signal path in which the identifier of the transmitting element starts with "A/" and the identifier of the receiving element starts with "B/" as a signal path connecting the design block A and the design block B. In another example, the error list generation circuit 26 may refer to an external constraint file indicating the relationship between the design blocks stored in the memory 11 and the identifiers of the signal path, the transmitting element and the receiving element to aggregate signal paths included in the comparison result list for each design block.

The error list output circuit 27 outputs the error list generated in step S212 to the output circuit 13 (S213). The output circuit 13 displays the input error list.

(Operation and Effects of Information Processing Apparatus According to First Embodiment)

Since the information processing apparatus according to the first embodiment generates an error list in which the signal paths included in the result of comparison between the correct answer value of the design value estimated by the machine learning model and the design value are aggregated for each design block, it is easier to examine the countermeasures for eliminating a timing error.

(Configuration and Function of Information Processing Apparatus Executing Timing Error Analysis According to Second Embodiment)

FIG. 13A is a circuit block diagram of an information processing apparatus that executes an installation position determination process according to a second embodiment and FIG. 13B is a functional block diagram of a processing circuit illustrated in FIG. 13A.

An information processing apparatus 2 is different from the information processing apparatus 1 in that the former includes a processing circuit 30 in place of the processing circuit 20. The processing circuit 30 is different from the processing circuit 20 in that the former includes an error ratio information generation circuit 31 and an error ratio information output circuit 32. The information processing apparatus 2 has the same configuration and functions of elements as the information processing apparatus 1, which are denoted by the same reference numerals, except the error ratio information generation circuit 31 and the error ratio information output circuit 32 and therefore, detailed explanation thereof will not be repeated.

(Timing Error Analysis Process by Information Processing Apparatus According to Second Embodiment)

Figure 14:
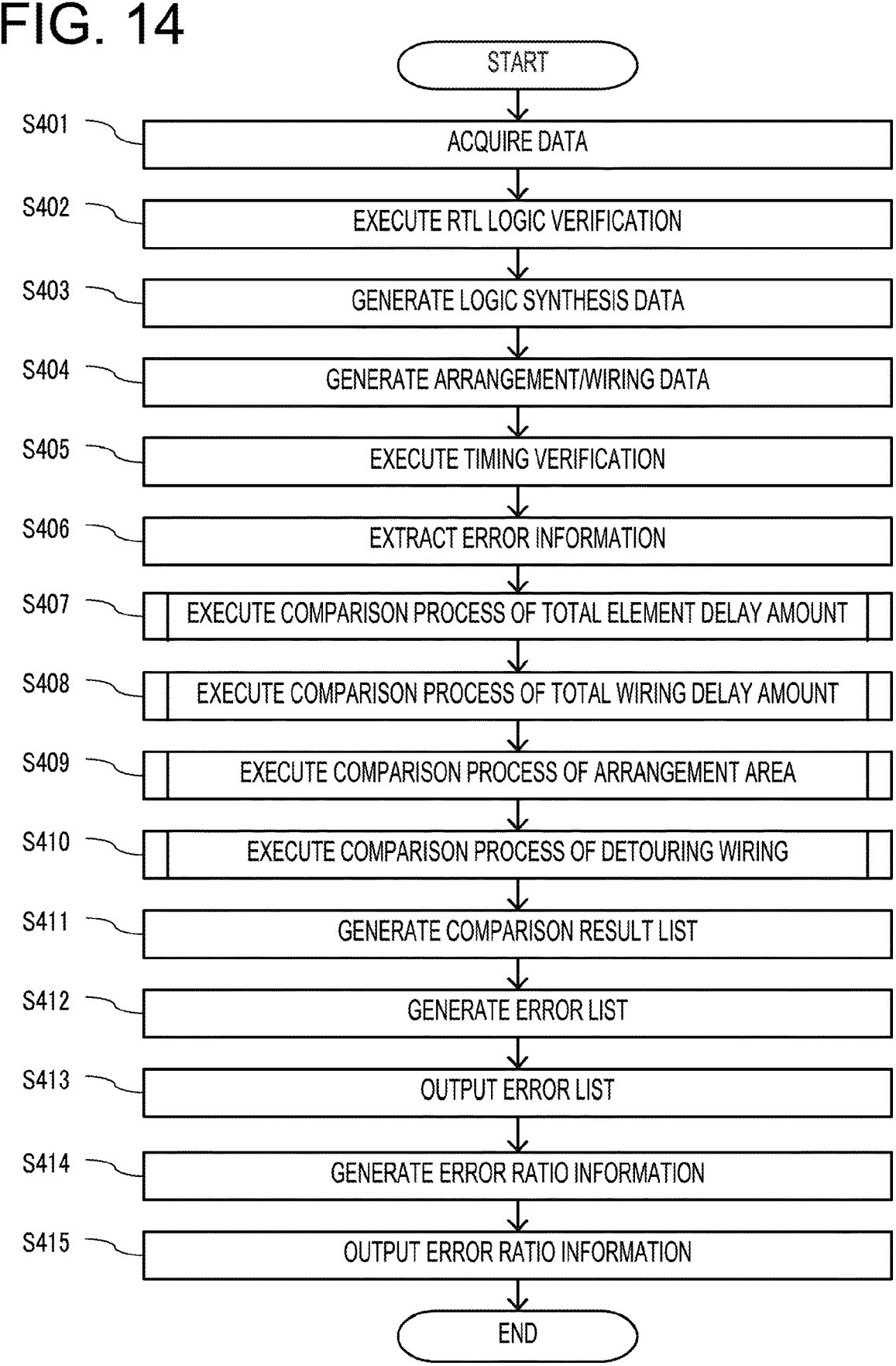
FIG. 14 is a flowchart of a timing error analysis process by the information processing apparatus illustrated in FIG. 13A.

FIG. 14 is a flowchart of a timing error analysis process by the information processing apparatus 2. The timing error analysis process illustrated in FIG. 14 is mainly executed by the processing circuit 30 in cooperation with various elements of the information processing apparatus 2 based on a program stored in advance in the memory 11.

Since the operations of steps S401 to S413 are the same as the operations of steps S201 to S213, detailed explanation thereof will not be repeated. The error ratio information generation circuit 31 generates first error ratio information and second error ratio information based on the comparison result list (S414). The first error ratio information indicates the ratio between a signal path associated with element delay error information and a signal path associated with wiring delay error information. That is, the first error ratio information indicates the ratio between a timing error caused by the total element delay amount and a timing error caused by the total wiring delay amount among signal paths included in timing verification information. In addition, the second error ratio information indicates the ratio between a signal path associated with arrangement area error information and a signal path associated with detouring wiring error information. That is, the second error ratio information indicates the ratio between a timing error caused by the arrangement area of an intermediate element and a timing error caused by the detour wiring included in a signal path, among signal paths whose timing errors are due to the total wiring delay amount. Then, the error ratio information output circuit 32 outputs the error ratio information generated in step S413 (S415).

Figure 15A:
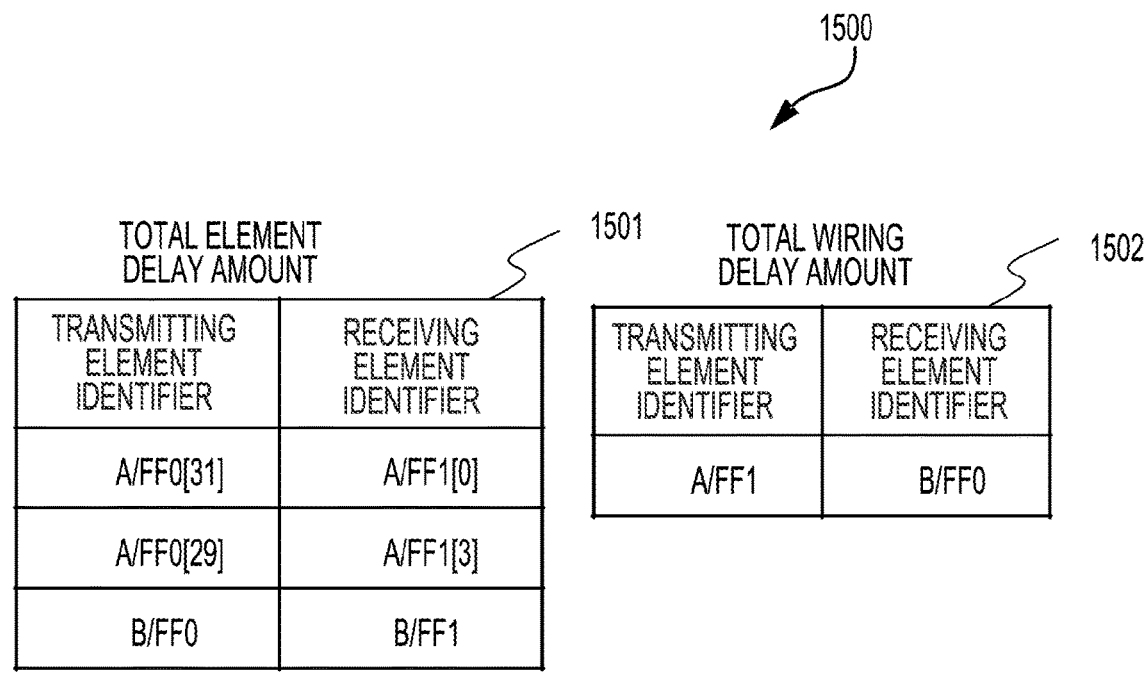
FIG. 15A is a view illustrating an example of error ratio information.
Figure 15B:
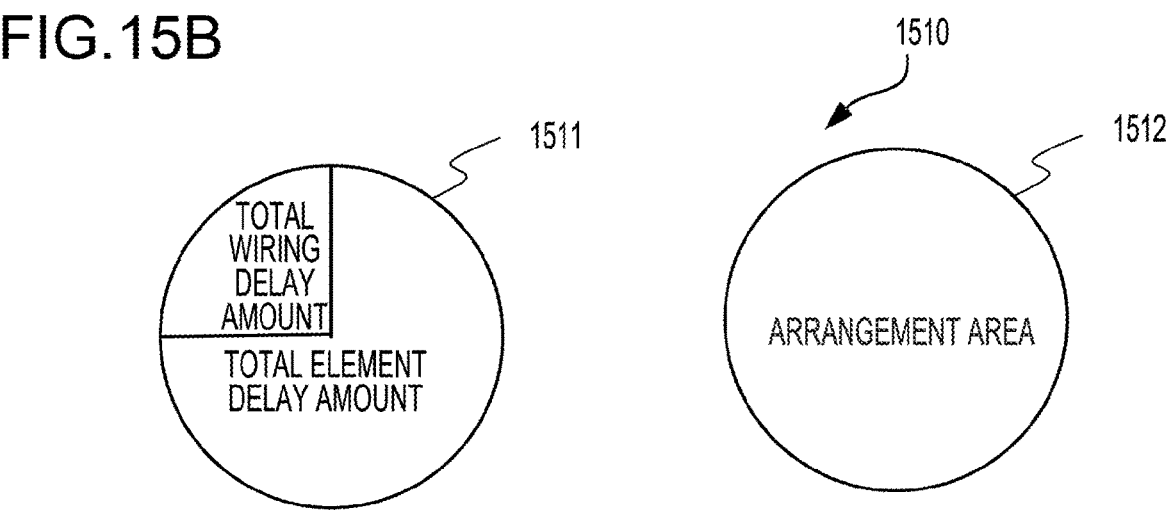
FIG. 15B is a view illustrating another example of the error ratio information.

FIG. 15A is a view illustrating an example of error ratio information, and FIG. 15B is a view illustrating another example of the error ratio information.

The error ratio information 1500 includes a total element delay amount table 1501 and a total wiring delay amount table 1502. The total element delay amount table 1501 and the total wiring delay amount table 1502 indicate identifiers of a transmitting element and a receiving element of a signal path for each signal path. The total element delay amount table 1501 includes three signal paths and the total wiring delay amount table 1502 includes one signal path.

The error ratio information 1510 is generated based on the error ratio information 1500 and includes first error ratio information 1511 and second error ratio information 1512. The first error ratio information 1511 is a pie chart indicating the ratio between the number of timing errors caused by the total element delay amount and the number of timing errors caused by the total wiring delay amount, among the signal paths included in the timing verification information. The second error ratio information 1512 is a pie chart illustrating the ratio between the number of timing errors caused by the arrangement area and the number of timing errors caused by the detour wiring, among the timing errors caused by the total wiring delay amount.

(Operation and Effects of Information Processing Apparatus According to Second Embodiment)

Since the information processing apparatus according to the second embodiment outputs the error ratio information indicating the ratio by the cause of the timing error, by referring to the error ratio information to examine the countermeasures, it is easier to examine the countermeasures for eliminating designer timing errors.

For example, when the ratio of the number of timing errors caused by the total element delay amount in the first error ratio information 1511 is high, the designer may estimate that there is a high possibility that a development period will be prolonged since the number of corrections at the RLT level increases. In the meantime, when the ratio of the number of timing errors caused by the total arrangement delay amount in the first error ratio information 1511 is high, the designer may estimate that a timing error has occurred since the arrangement constraint conditions of design blocks when executing the arrangement/wiring process are loose.

(Configuration and Function of Information Processing Apparatus Executing Timing Error Analysis According to Third Embodiment)

FIG. 16A is a circuit block diagram of an information processing apparatus that executes an installation position determination process according to a third embodiment and FIG. 16B is a functional block diagram of a processing circuit illustrated in FIG. 16A.

An information processing apparatus 3 is different from the information processing apparatus 2 in that former includes a processing circuit 40 in place of the processing circuit 30. The processing circuit 40 is different from the processing circuit 30 in that the former includes an error list generation circuit 46 in place of the error list generation circuit 26. The information processing apparatus 3 has the same configuration and functions of elements as the information processing apparatus 2, which are denoted by the same reference numerals, except the error list generation circuit 46 and therefore, detailed explanation thereof will not be repeated.

(Timing Error Analysis Process by Information Processing Apparatus According to Third Embodiment)

Figure 17:
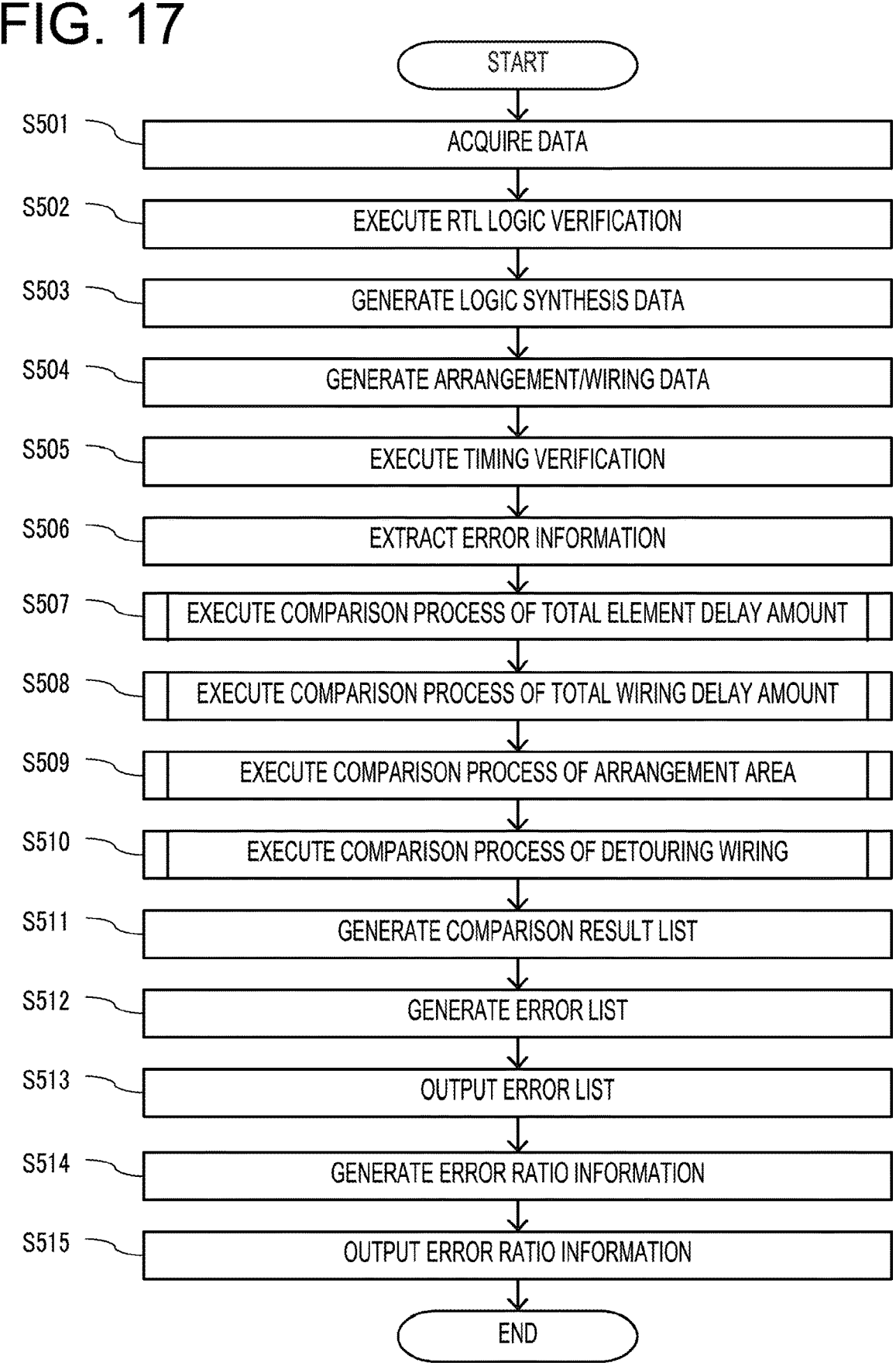
FIG. 17 is a flowchart of a timing error analysis process by the information processing apparatus illustrated in FIG. 16A.

FIG. 17 is a flowchart of a timing error analysis process by the information processing apparatus 3. The timing error analysis process illustrated in FIG. 17 is mainly executed by the processing circuit 40 in cooperation with various elements of the information processing apparatus 3 based on a program stored in advance in the memory 11.

Since the operations of steps S501 to S511 and steps S513 to S515 are the same as the operations of steps S401 to S411 and steps S413 to S415, detailed explanation thereof will not be repeated. The error list generation circuit 46 generates an error list including information indicating signal paths aggregated for each design block and showing a bus as a single signal path, and countermeasures (S512).

Figure 18:
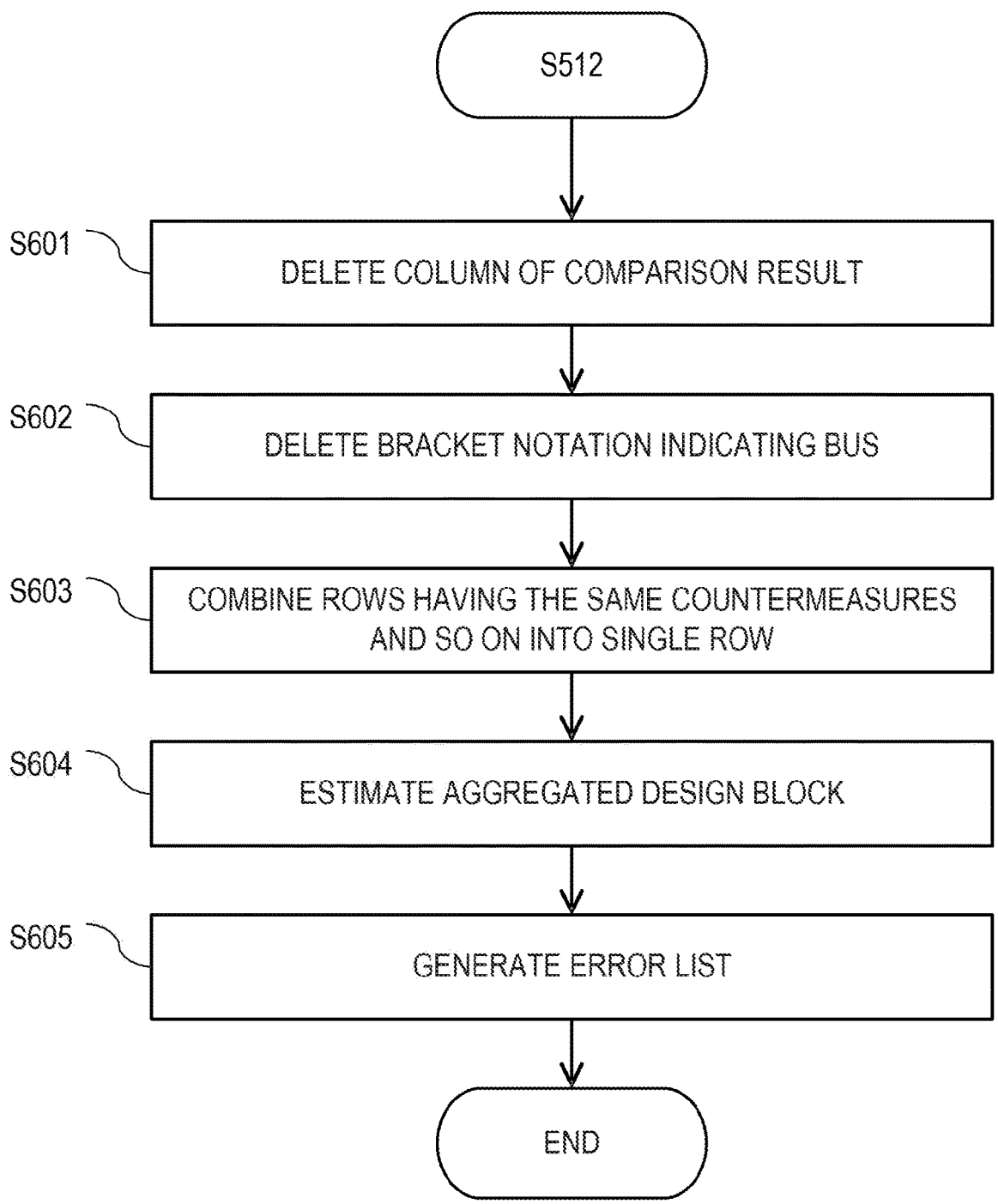
FIG. 18 is a flowchart illustrating more details of step S512 illustrated in FIG. 17.

FIG. 18 is a flowchart illustrating more details of step S512 illustrated in FIG. 17.

First, the error list generation circuit 46 deletes the column of the comparison result from the comparison result list generated in step S511 (S601). Next, the error list generation circuit 46 deletes the bracket notation [ni] indicating a bus from the row of the transmitting element identifier and the receiving element identifier of the comparison result list from which the comparison result column has been deleted in step S601 (S602). Next, the error list generation circuit 46 combines the rows having the same transmitting element identifier, receiving element identifier and countermeasures into a single row from the comparison result list from which the bracket notation [ni] indicating the bus has been deleted in step S602 (S603). Next, the error list generation circuit 46 estimates a design block in which the signal paths included in the comparison result list are aggregated (S604). Then, the error list generation circuit 46 aggregates signal paths for each design block estimated in step S604 to generate an error list including information indicating the signal paths aggregated for each design block, and the countermeasures (S605).

Figure 19:
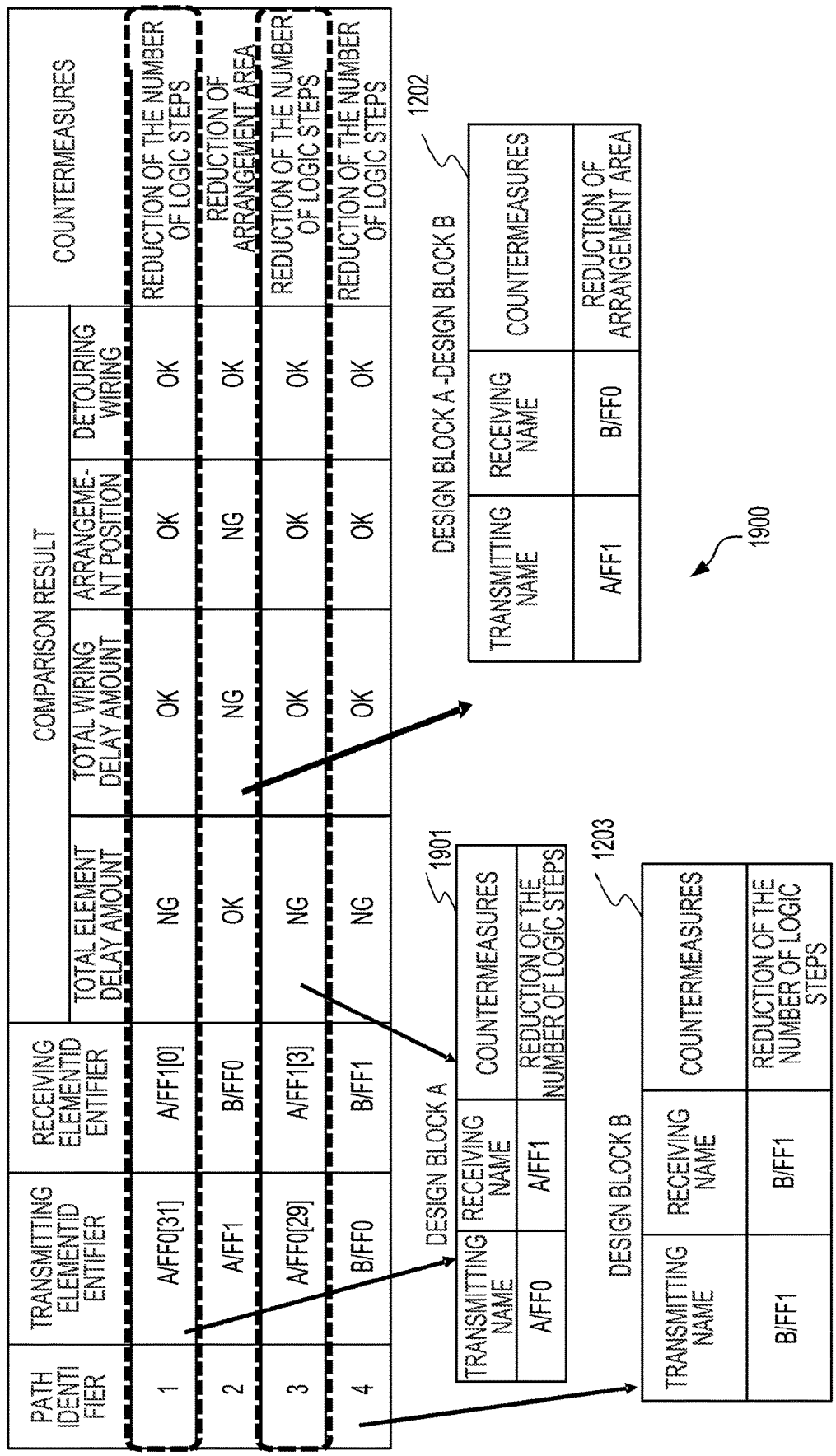
FIG. 19 is a view illustrating an example of an error list generated in step S512 illustrated in FIG. 17.

FIG. 19 is a view illustrating an example of the error list generated in step S512. The error list 1900 is an example of the error list generated from the comparison result list 1100.

The error list 1900 is different from the error list 1200 illustrated in FIG. 12 in that the former includes first error list 1901 in place of the first error list 1201. The first error list 1901 is different from the first error list 1201 in that two paths estimated to form a bus in the first error list 1201 are indicated by a single path.

(Operation and Effects of Information Processing Apparatus According to Third Embodiment)

Generally, a circuit includes various buses such as a data bus, an address bus and the like. Since signal paths forming a bus often have the same configuration, when a timing error occurs in one signal path forming the bus, there is a high possibility that a timing error will occur in the other signal paths forming the bus for the same reason. In addition, since the bus often have relatively large bit widths such as 32 bits and 64 bits, when the signal paths forming the bus are separately indicated in the error list, the timing error analysis by a designer becomes complicated since the number of signal paths indicated in the error list increases.

Figure 20:
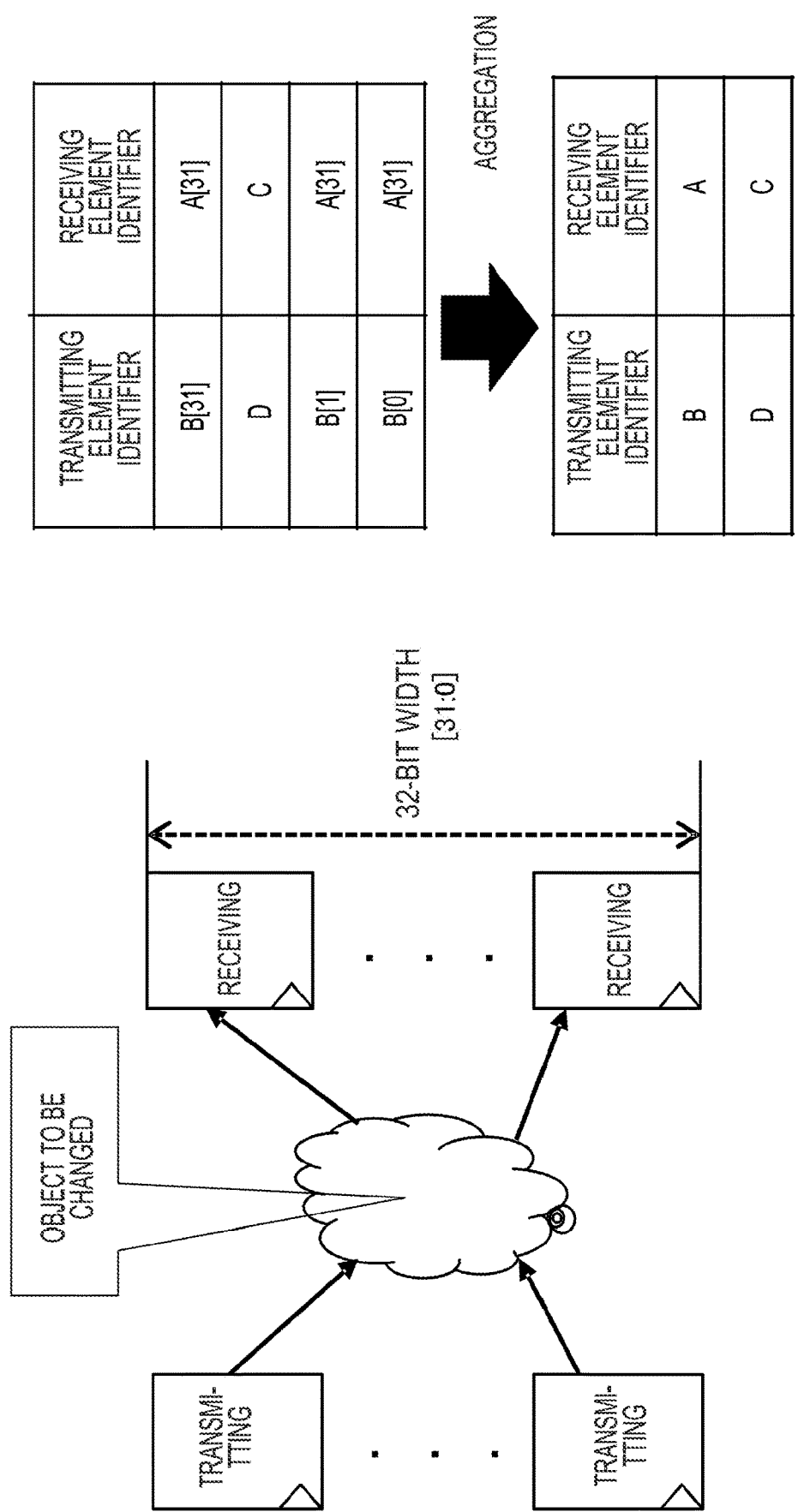
FIG. 20 is a view for explaining the operation and effects of the information processing apparatus according to the third embodiment.

Since the information processing apparatus according to the third embodiment indicates multiple signal paths forming a bus, as a single signal path, in an error list, it is easy for the designer to examine the countermeasures for eliminating timing errors of the multiple signal paths included in the bus. For example, as illustrated in FIG. 20, in a case where a timing error has occurred in three signal buses for the same reason, among signal buses having the bit width of 32 bits, the information processing apparatus according to the third embodiment indicates signal paths included in the buses indicated over three rows, as a single signal path. Since the information processing apparatus according to the third embodiment indicates the multiple signal paths included in a bus, as a single signal path, in an error list, it is possible to reduce the number of signal paths indicated in the error list and more clearly indicate a signal path in which a timing error has occurred.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A timing error analysis method that is executed by a computer, the method comprising:
   extracting, from error information including a delay amount of a signal path in which a timing error has occurred and arrangement/wiring information of an element included in the signal path, a design value related to the delay amount of the signal path and a feature that is an input when a machine learning model learns with the design value as an output;
   estimating a correct answer value of the design value from the feature and the machine learning model that learns a relationship between the design value and the feature;
   comparing the design value with the correct answer value and storing a comparison result;
   generating a comparison result list including countermeasures for eliminating the timing error according to the comparison result;
   aggregating signal paths included in the comparison result list for each of design blocks to generate an error list that includes information indicating the signal paths aggregated for each of the design blocks and the countermeasures; and
   outputting the error list,
   the signal paths of the error list include a signal path that connects two of the design blocks,
   the design value includes a total element delay amount of elements included in the signal path and a total wiring delay amount caused by wirings included in the signal path, and
   the storing of the comparison result includes:
   generating element delay error information that indicates that the total element delay amount of the signal path is a cause of the timing error when the total element delay amount is larger than a correct answer value of the total element delay amount, and storing the element delay error information in association with identification information of the signal path; and
   generating wiring delay error information that indicates that the total wiring delay amount of the signal path is a cause of the timing error when the total wiring delay amount is larger than a correct answer value of the total wiring delay amount, and storing the wiring delay error information in association with the identification information of the signal path.

2. The timing error analysis method according to claim 1, further comprising:
   generating first error ratio information that indicates a ratio between a signal path associated with the element delay error information and a signal path associated with the wiring delay error information based on the comparison result list; and
   outputting the first error ratio information.

3. The timing error analysis method according to claim 2, wherein the design value further includes arrangement area information related to an arrangement area of elements included in the signal path and wiring length information that indicates a total wiring length of wirings included in the signal path, and the generating of the comparison result list includes:
generating arrangement area error information that indicates that the arrangement area information of the signal path is a cause of the timing error when the arrangement area information is larger than a correct answer value of the arrangement area information, and storing the arrangement area error information in association with the identification information of the signal path; and generating detouring wiring error information that indicates that detouring wiring of the signal path is a cause of the timing error when the wiring length corresponding to the wiring length information is larger than a correct answer value of the wiring length, and storing the detouring wiring error information in association with the identification information of the signal path.

4. The timing error analysis method according to claim 2, further comprising:
generating second error ratio information that indicates a ratio between a signal path associated with the arrangement area error information and a signal path associated with the detouring wiring error information based on the comparison result list; and
outputting the second error ratio information.

5. The timing error analysis method according to claim 1, wherein the generating of the error list further includes defining a signal path that forms a bus together with another signal path as a single signal path by integrating the signal path with the another signal path.

6. The timing error analysis method according to claim 1, wherein the comparison result list includes identification information that indicates an element included in the signal path, and
the aggregating of the signal paths included in the comparison result list for each of the design blocks further includes determining a design block in which the signal paths are aggregated, based on the identification information.

7. An information processing apparatus comprising:
a parameter extraction circuit configured to extract, from error information including a delay amount of a signal path in which a timing error has occurred and arrangement/wiring information of an element included in the signal path, a design value related to the delay amount of the signal path and a feature that is an input when a machine learning model learns with the design value as an output;
a correct answer value estimation circuit configured to estimate a correct answer value of the design value from the feature and a machine learning model that learns a relationship between the design value and the feature;
a correct answer value comparison circuit configured to compare the design value with the correct answer value and store a comparison result;
a comparison result list generation circuit configured to generate a comparison result list including countermeasures for eliminating the timing error according to the comparison result;
an error list generation circuit configured to aggregate signal paths included in the comparison result list for each of design blocks and generate an error list that includes information indicating the signal paths aggregated for each of the design blocks and the countermeasures; and
an error list output circuit configured to output the error list,
the signal paths of the error list include a signal path that connects two of the design blocks,
the design value includes a total element delay amount of elements included in the signal path and a total wiring delay amount caused by wirings included in the signal path, and
an operation to store the comparison result includes:
generating element delay error information that indicates that the total element delay amount of the signal path is a cause of the timing error when the total element delay amount is larger than a correct answer value of the total element delay amount, and storing the element delay error information in association with identification information of the signal path; and
generating wiring delay error information that indicates that the total wiring delay amount of the signal path is a cause of the timing error when the total wiring delay amount is larger than a correct answer value of the total wiring delay amount, and storing the wiring delay error information in association with the identification information of the signal path.

8. A non-transitory computer-readable recording medium having stored therein a program for causing a computer to execute a process for timing error analysis, the process comprising:
extracting, from error information including a delay amount of a signal path in which a timing error has occurred and arrangement/wiring information of an element included in the signal path, a design value related to the delay amount of the signal path and a feature that is an input when a machine learning model learns with the design value as an output;
estimating a correct answer value of the design value from the feature and a machine learning model that learns a relationship between the design value and the feature;
comparing the design value with the correct answer value and storing a comparison result;
generating a comparison result list including countermeasures for eliminating the timing error according to the comparison result;
aggregating signal paths included in the comparison result list for each of design blocks to generate an error list that includes information indicating the signal paths aggregated for each of the design blocks and the countermeasures; and
outputting the error list,
the signal paths of the error list include a signal path that connects two of the design blocks,
the design value includes a total element delay amount of elements included in the signal path and a total wiring delay amount caused by wirings included in the signal path, and
the storing of the comparison result includes:
generating element delay error information that indicates that the total element delay amount of the signal path is a cause of the timing error when the total element delay amount is larger than a correct answer value of the total element delay amount, and storing the element delay error information in association with identification information of the signal path; and
generating wiring delay error information that indicates that the total wiring delay amount of the signal path is a cause of the timing error when the total wiring delay amount is larger than a correct answer value of the total wiring delay amount, and storing the wiring delay error information in association with the identification information of the signal path.

* * * * *